United States Patent [19]

Thom et al.

[11] 4,321,645
[45] Mar. 23, 1982

[54] DIFFERENTIAL FAULT CURRENT PROTECTION OF A MULTIPROCESSOR CONTROLLED ELECTRIC POWER GENERATING SYSTEM

[75] Inventors: James B. Thom, Rock City; Richard P. Ejzak, Chicago, both of Ill.

[73] Assignee: Sundstrand Corporation, Rockford, Ill.

[21] Appl. No.: 124,666

[22] Filed: Feb. 26, 1980

[51] Int. Cl.³ .............................................. H02H 3/32
[52] U.S. Cl. ........................................ 361/63; 307/19; 361/87
[58] Field of Search .................... 361/63, 64, 67, 87; 307/18, 19, 23

[56] References Cited

U.S. PATENT DOCUMENTS

| | | | |
|---|---|---|---|
| 2,832,896 | 4/1958 | Stineman et al. | 307/19 X |
| 2,974,257 | 3/1961 | Flugstad | 361/87 X |
| 3,617,812 | 11/1971 | Deteo | 361/87 X |
| 4,068,275 | 1/1978 | Teel et al. | 361/63 X |

Primary Examiner—Harry E. Moose, Jr.
Attorney, Agent, or Firm—Ted E. Killingsworth; Michael B. McMurry; Harold A. Williamson

[57] ABSTRACT

The invention relates to a fault current detection, isolation and clearing system for use in an integrated power generating and distribution arrangement having multiple generators electrically connected to loads and to a distribution bus through circuit breakers. The system includes a power control logic unit and circuit breaker condition detection units which have their outputs electrically coupled to the power control logic unit. Fault current detection circuits are coupled to the electrical connections of the generating and distribution arrangement and have outputs electrically coupled to the power control logic unit. The power control logic unit has an output which is controllingly electrically connected to the circuit breakers to control the circuit breakers and clear faults from the generating and distribution arrangement as a function of circuit breaker conditions and fault currents detected.

29 Claims, 20 Drawing Figures

DIFFERENTIAL FAULT CURRENT PROTECTION OF A MULTIPROCESSOR CONTROLLED ELECTRIC POWER GENERATING SYSTEM

TECHNICAL FIELD

This invention relates to a fault current detection, isolation and clearing arrangement for use in a power generating and distribution system having multiple generators.

BACKGROUND ART

Aircraft electrical distribution systems have become increasingly complex. The complexity, in part, is a by-product of the fact that most multi-engine aircraft have generators associated with each engine. The generators are driven through integrated drive trains which provide a constant speed output to the generators even though the engines are operating at varying speeds. The electrical wiring is strung throughout the wings and fuselage of the aircraft which results in a number of regions within the aircraft where an electrical wiring fault may occur. While broadly speaking, a fault may be an open circuit condition; the faults to which the invention is directed are of the short circuit type. The presence of a fault of the short circuit type, if not instantly detected and isolated from a power generating source, results in heightened probability of an electrically caused fire at the fault. It is not uncommon for modern aircraft to have in addition to the generators driven by the aircraft engines an additional or auxiliary engine that drives an auxiliary power generator. The main generators driven from the aircraft's engines as well as the auxiliary power generator are mutually interconnected via a distribution bus and circuit breakers to thereby provide a plurality of power channels or paths to the aircraft electrical system loads. The detection of faults within the electrical distribution system and the control of breakers to isolate faults and redirect power has been a concern for many years. The detection of faults through the employment of inductively coupled differential current detection circuits has been utilized as is evidenced by Flugstad U.S. Pat. No. 2,974,257. Flugstad provides a protective apparatus for a power system in which the distribution network is fed from parallel connected generators. FIG. 1 of Flugstad illustrates the presence of a pair of generators 12 and 14, which have direct current field windings 16 and 18, respectively, and neutral armature conductors 20, 22, 24 and 26, 28, 30, respectively. Feeder bus networks 32 and 34 are arranged to be connected to a paralleling bus network 64. Generator circuit breakers 48 and 50 respectively connect generator output conductors 52, 54, 56 and 58, 60, 62 to conductors 36, 38, 40 and 42, 44, 46. Bus tie breakers 72 and 74 connect these last noted conductors to the parallel bus 64. Differential fault detection is provided by sensing circuits 194 and 196. The sensing circuits 194 and 196 control the energization of direct current field windings 16 and 18 of generators 12 and 14 as well as bus tie breakers 72 and 74. Flugstad offers no system for clearing faults throughout an entire distribution system. Flugstad also does not contemplate the provision of fault detection when many loads are fed through a number of power channels from a plurality of power sources.

The Deter U.S. Pat. No. 3,617,812 is directed to differential fault detection for providing short circuit protection for electrical networks such as those found in airborne power supply systems. The Deter system includes a series of current transformers 10, 11, 15, 16, 17 for monitoring the input leads $C_1$, $C_2$ and output leads $C_3$, $C_4$, $C_5$ of a network and further provides a summing circuit 20 for summing the output signals from the current transformers 10, 11, 15, 16, 17. Where a fault exists in the network, a nonzero current summation will result and a corresponding output is fed to a comparator 30 and thence to a control unit 40 which initiates a programmed switching operation within the network to locate the fault. It can be seen that Deter requires a multitude of switch operations with attendant time delays in order to locate a fault. Deter does not provide, as applicant's invention will demonstrate, an ability to immediately locate a fault and clear the fault while leaving as many loads fully powered as possible. The invention to be described accomplishes the clearing of faults with a minimum of breaker action all of which cannot be duplicated by either Flugstad or Deter.

DISCLOSURE OF INVENTION

The present invention relates to a differential fault current detection and fault clearing arrangement for use in airborne power supply systems having multiple generators. The arrangement and system include in combination first, second and third generators having neutral armature windings and generator circuit breakers connecting the first and second generators to first and second loads. The third generator, which may be an auxiliary power generator, is connected through a circuit breaker to an electrical distribution bus. Bus tie breakers are provided which are connected in series and are located respectively between the first load and the distribution bus and the second load and the distribution bus. First, second, third and fourth differential fault current detection circuits are provided with each of the first and second differential fault current detection circuits providing outputs indicative of a fault detected between the neutral armature windings respectively of the first and second generators, the first and second loads and the distribution bus. The third differential fault current detection circuit provides an output indicative of a fault detected between the neutral armature winding of the third generator and the distribution bus. The fourth differential fault current detection circuit provides an output indicative of faults detected respectively between the first load and its associated bus tie breaker and between the second load and the second load associated bus tie breaker as well as between the third generator and the third generator circuit breaker and on the distribution bus. Each of the system breakers, whether they be circuit or bus tie, have breaker condition detection means in the form of auxiliary contacts which provide an output indicative of the breaker condition. Each of the breakers further include a breaker control means which allows independent control of each of the breakers. The final component of the system is a power control logic network electrically coupled to the circuit breaker condition detection means output and to the first, second, third and fourth differential fault current detection circuits. The power control logic network has an output electrically connected to each breaker control means to control breaker action in a programmed manner in response to faults detected within the system.

It is therefore a primary object of this invention to provide a differential fault current detection and circuit breaker control system which will quickly clear any fault current in a multiple generator powered electrical network in which it is employed.

Another object of this invention is to provide a circuit breaker control unit for an airborne power generating system which unit is programmed to leave as many loads powered as possible while simultaneously clearing any fault current in the system.

Yet another object of the invention is to provide a circuit breaker control unit which employs a programmed microprocessor control that minimizes breaker action thereby reducing the number of power interruptions experienced by the electrical generating and distribution system in which it is utilized.

In the attainment of the foregoing objects, the invention contemplates in an elemental form that the power generating system include at least a first and a second generator. Each of the generators has a set of neutral armature conductors and a set of output conductors. The set of output conductors of the first generator is electrically connected through a generator circuit breaker to a load and to one side of a bus tie breaker. The set of output conductors of the second generator is electrically connected through an electrical distribution bus to the other side of the bus tie breaker.

The fault current detection circuits preferably take the form of current transformer circuits.

A first current transformer circuit is inductively coupled to the set of neutral armature conductors of the first generator, to the set of output conductors between the generator circuit breaker and the load and to the distribution bus. The first current transformer circuit provides a differential fault current output signal only when a fault exists and is detected by the inductive coupling to any one of the neutral armature conductors, the output conductors and the distribution bus.

A second current transformer circuit includes a portion thereof that is inductively coupled to the set of output conductors from the first generator at a point between the generator circuit breaker and the bus tie breaker. The second transformer circuit provides an output signal whenever a differential fault current exists and is detected by the second current transformer circuit.

The generator circuit breakers and the bus tie breakers each include a breaker control means as well as a circuit breaker condition detection unit. Each of the circuit breaker condition detection units provides an output indicative of whether the breaker is open or closed.

A power control logic network is electrically coupled to the first current transformer circuit output, the second current transformer circuit output and each of the circuit breaker condition detection unit outputs. The power control logic network has an output electrically connected to the breaker control means to control breaker action in response to faults detected within the power generating and distribution system.

While the invention finds utility in its most elemental form just described, the significance of the invention can be appreciated even more when a preferred embodiment is reviewed. The preferred embodiment is that found in an aircraft with generators driven respectively by engines on the wings on either side of the aircraft. The aircraft electrical loads are divided and an engine generator combination provides power for one half of the loads while the other engine provides power for the other half of the loads. An auxiliary engine is mounted in the aircraft's fuselage and provides power to either half of the load, or both, should conditions demand.

In this embodiment, the power generating system has a first and second generator and an auxiliary generator. Each generator has a set of neutral armature conductors and a set of output conductors.

The sets of output conductors of the first and the second generators are respectively electrically connected through a first generator circuit breaker and a second generator circuit breaker to a first load and a second load and to one side of a first bus tie breaker and a second bus tie breaker. The output conductors of the auxiliary generator are connected through an auxiliary bus tie breaker to the other side of each of the first and second bus tie breakers through an electrical distribution bus.

A first generator current transformer circuit is inductively coupled to the set of neutral armature conductors of the first generator, to the set of output conductors between the first generator circuit breaker and the first load and to the distribution bus.

A second generator current transformer circuit is inductively coupled to the set of neutral armature conductors of the second generator, to the set of output conductors between the second bus tie breaker and the second load and to the distribution bus.

The first and second generator current transformer circuits provide an output signal only when a fault exists and is detected by the inductive couplings to any one of the sets of neutral armature conductors, the sets of output conductors and the distribution bus.

An auxiliary generator differential fault current transformer circuit is inductively coupled to the set of neutral armature conductors of the auxiliary generator and the distribution bus. The auxiliary generator fault current transformer circuit provides an output signal only when a fault exists and is detected by the inductive couplings to any one of the neutral armature conductors of the auxiliary generator and the distribution bus.

A tie bus differential current detection circuit is inductively coupled to the sets of output conductors respectively from the first and the second generators at points between the first and second generator circuit breakers and the first and second bus tie breakers. The tie bus differential current detection circuit is also coupled to the set of output conductors of the auxiliary generator. The tie bus differential current detection circuit provides an output whenever a fault exists and is detected by the tie bus differential current detection circuit.

The first and second generator circuit breakers, the first and second bus tie breakers and the auxiliary bus tie breaker each have coupled thereto a breaker control means and a circuit breaker condition detection unit. The circuit breaker condition detection units each have an output lead connect thereto upon which appears a signal indicative of the circuit breaker condition.

A power control logic network is electrically coupled to each of the circuit breaker condition detection unit outputs and to the outputs of the first and second generator current transformer circuit means, the tie bus differential current detection circuit, and the auxiliary generator differential fault current transformer circuit.

The power control logic network has an output electrically connected to each breaker control means to control breaker action in a programmed manner in response to the condition of the breakers and faults detected within the system.

It will be appreciated from the description above that there are a plurality of power channels to the first and second load and these power channels are from the first, second and auxiliary generators through the associated breakers and the distribution bus.

One embodiment of the invention includes overlap current detection circuits which are inductively coupled to the output conductors from the generators on the load side of the first and second bus tie breakers. The overlap current detection circuits provide outputs indicative of a predetermined current level detected in a power channel to the first load from the second generator and the auxiliary generator and in a power channel to the second load from the first generator and the auxiliary generator. The power control logic network has electrically coupled thereto the outputs from the overlap current detection circuits whereby the power control logic network is additionally responsive to the presence of current which exceeds a predetermined level, which current is detected by the overlap fault detection circuits.

Other objects and advantages of the present invention will be apparent upon reference to the accompanying description when taken in conjunction with the following drawings:

BEST MODE FOR CARRYING OUT THE INVENTION

Figure 1:
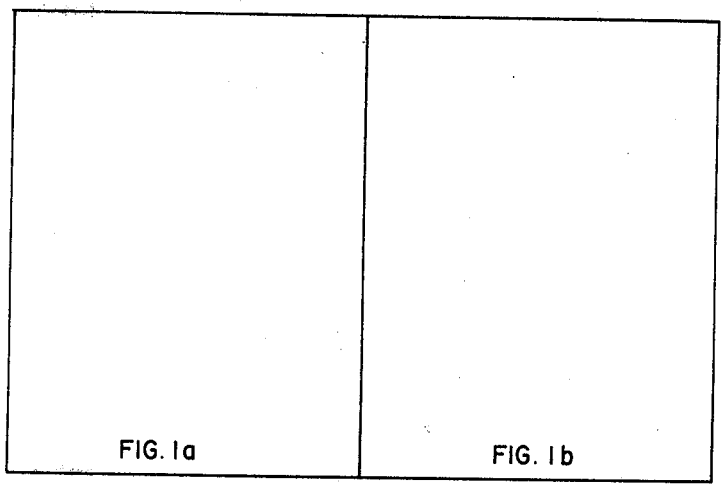
FIG. 1 is made up FIG. 1a and FIG. 1b as shown and is a schematic diagram of an aircraft electric power generating and distribution system embodying the invention.
Figure 2:
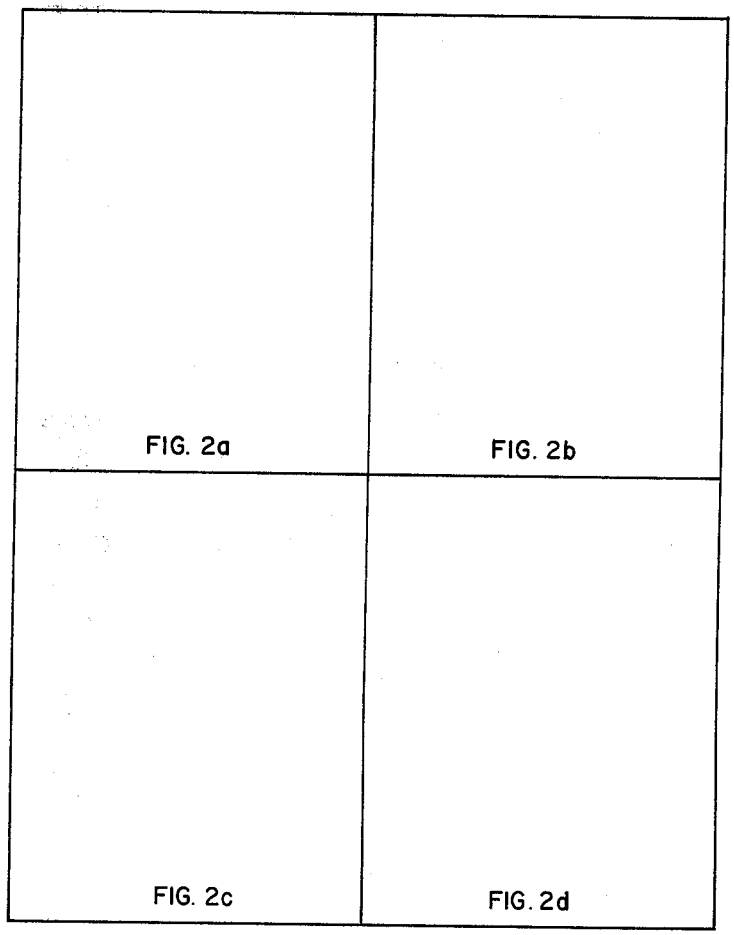
FIG. 2 is made up of FIG. 2a, FIG. 2b, FIG. 2c and FIG. 2d as shown and is a schematic diagram of the basic circuit details taken from FIG. 1 which embody the invention.
Figure 1A:
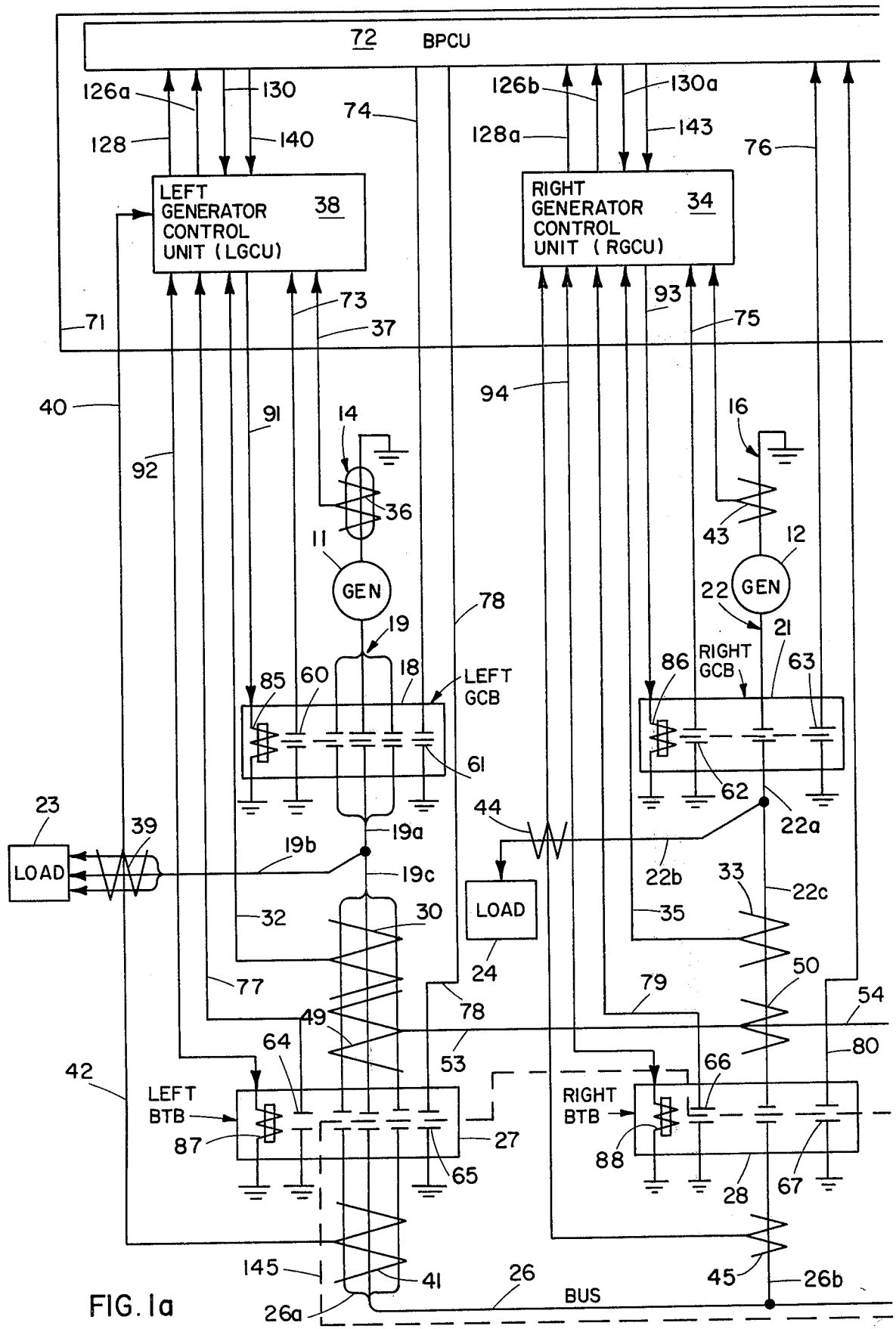
Figure 1B:
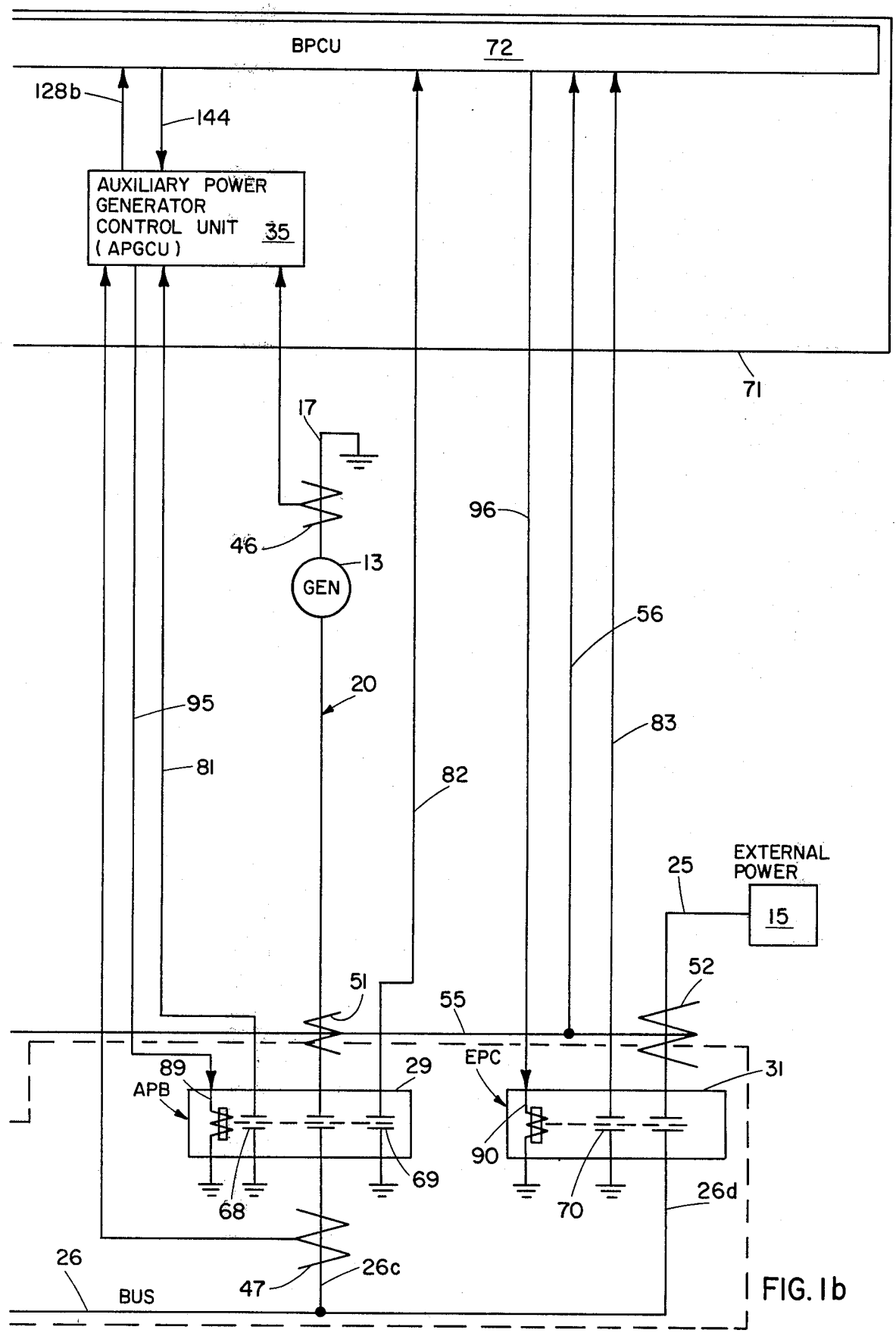
Figure 2A:
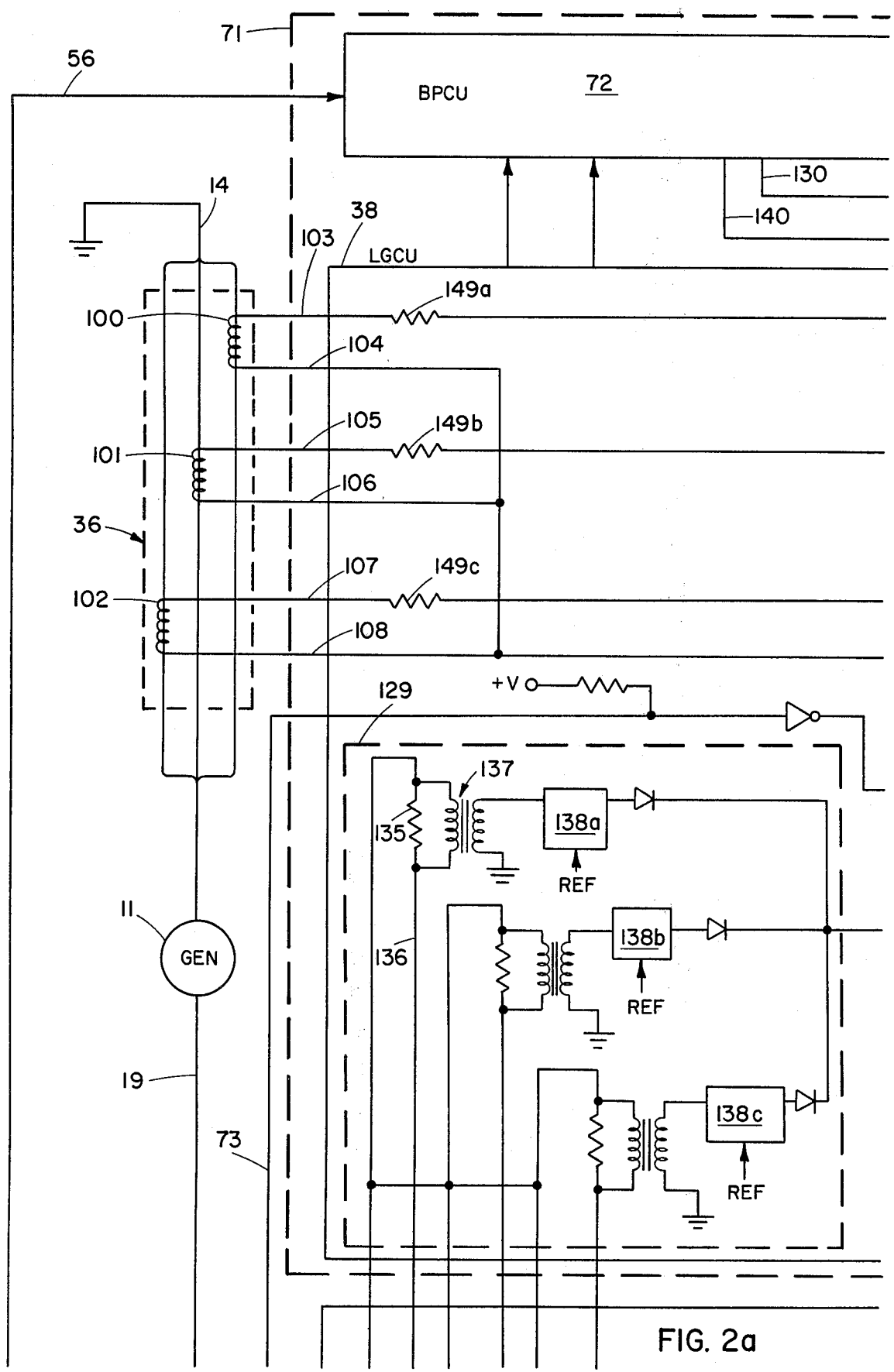
Figure 2B:
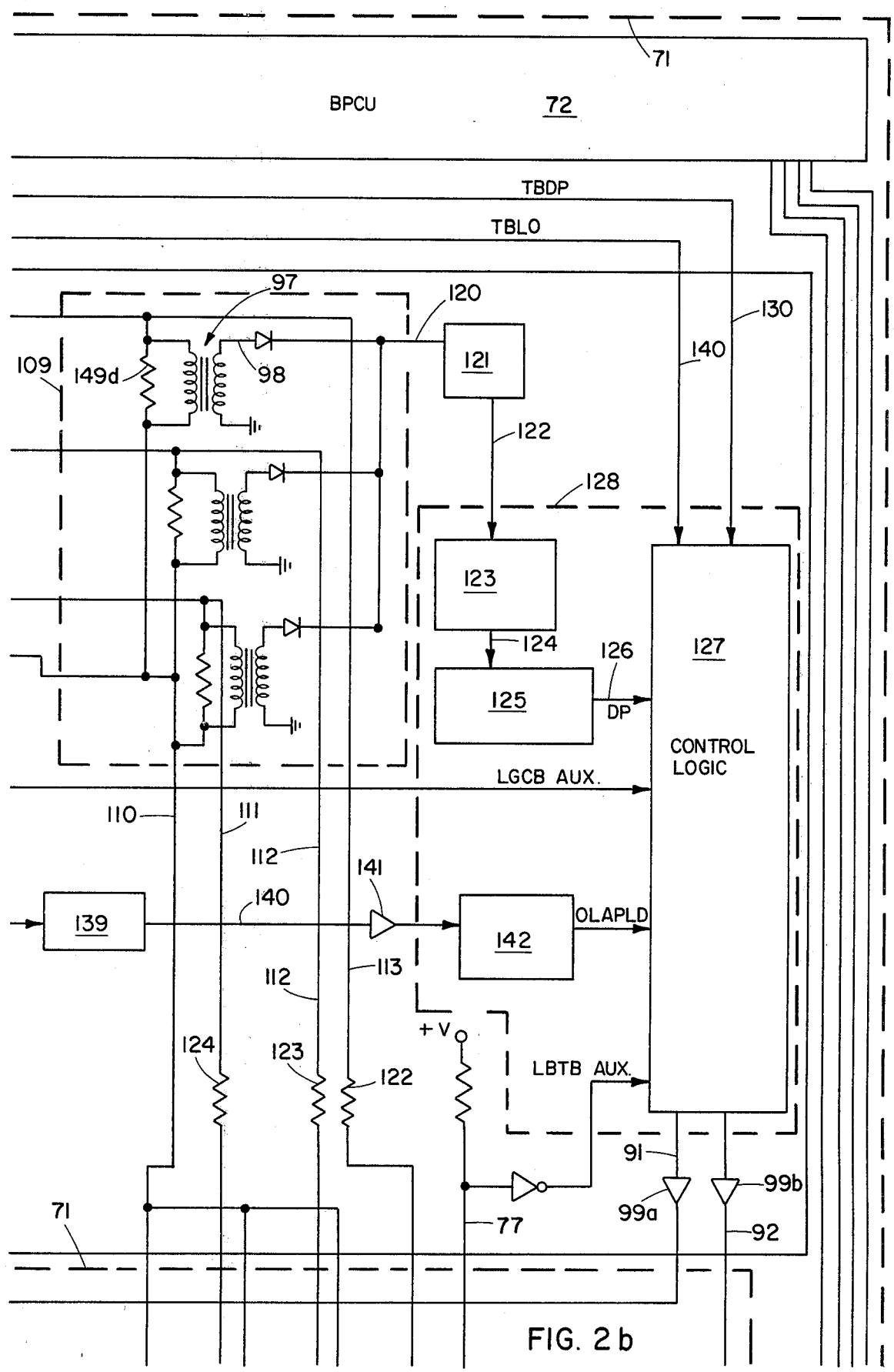
Figure 2C:
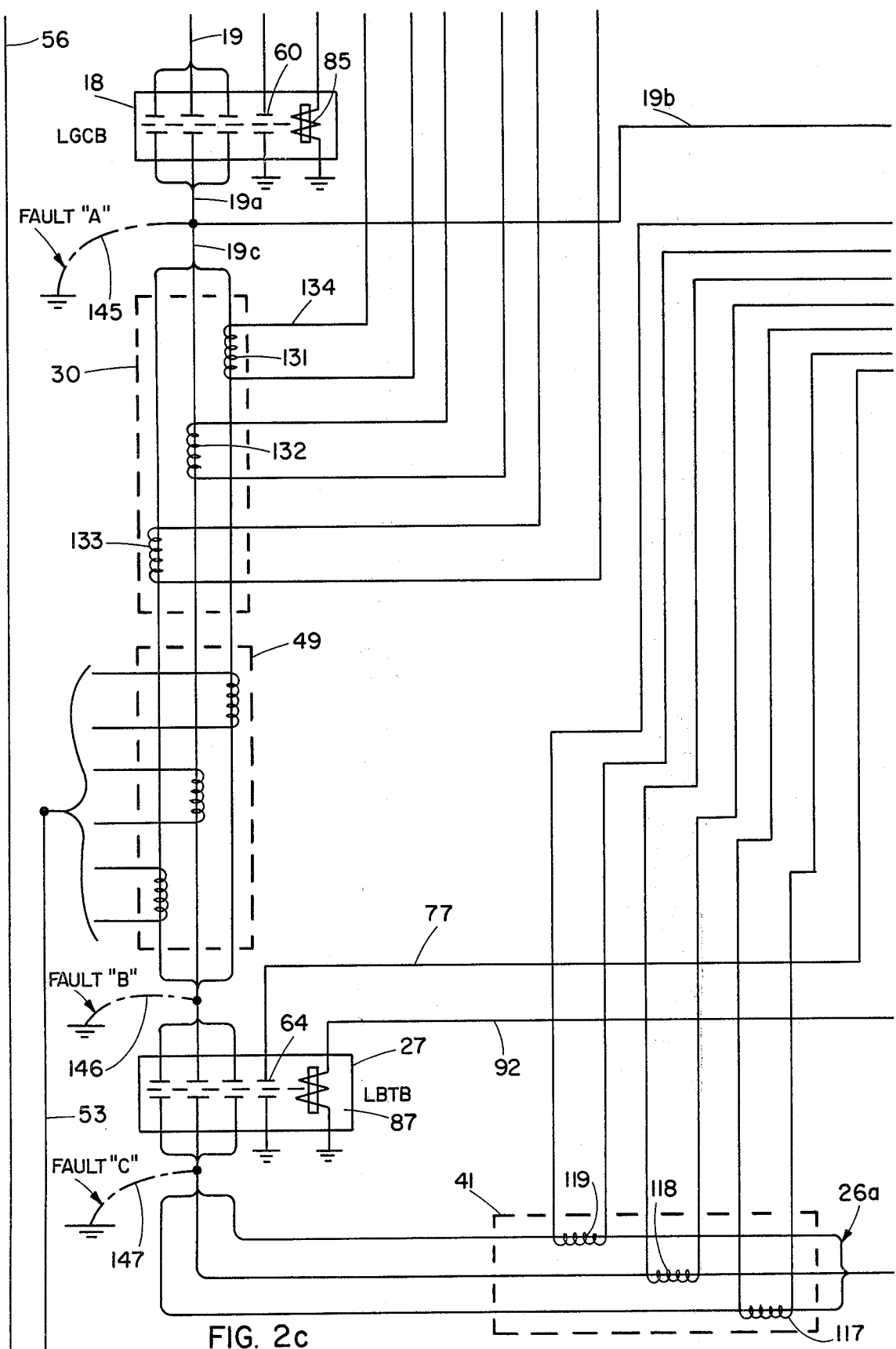
Figure 2D:
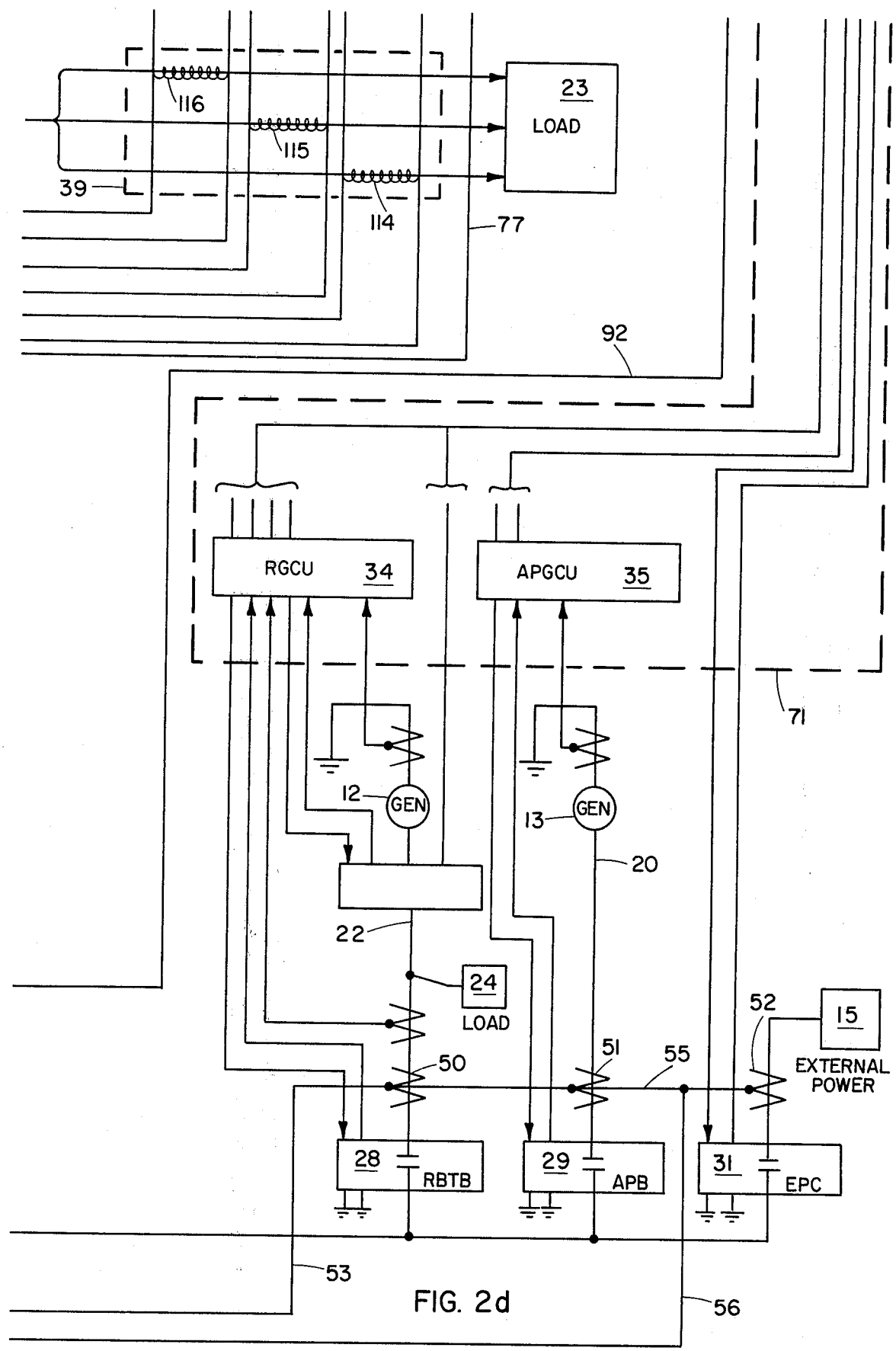
Figure 3:
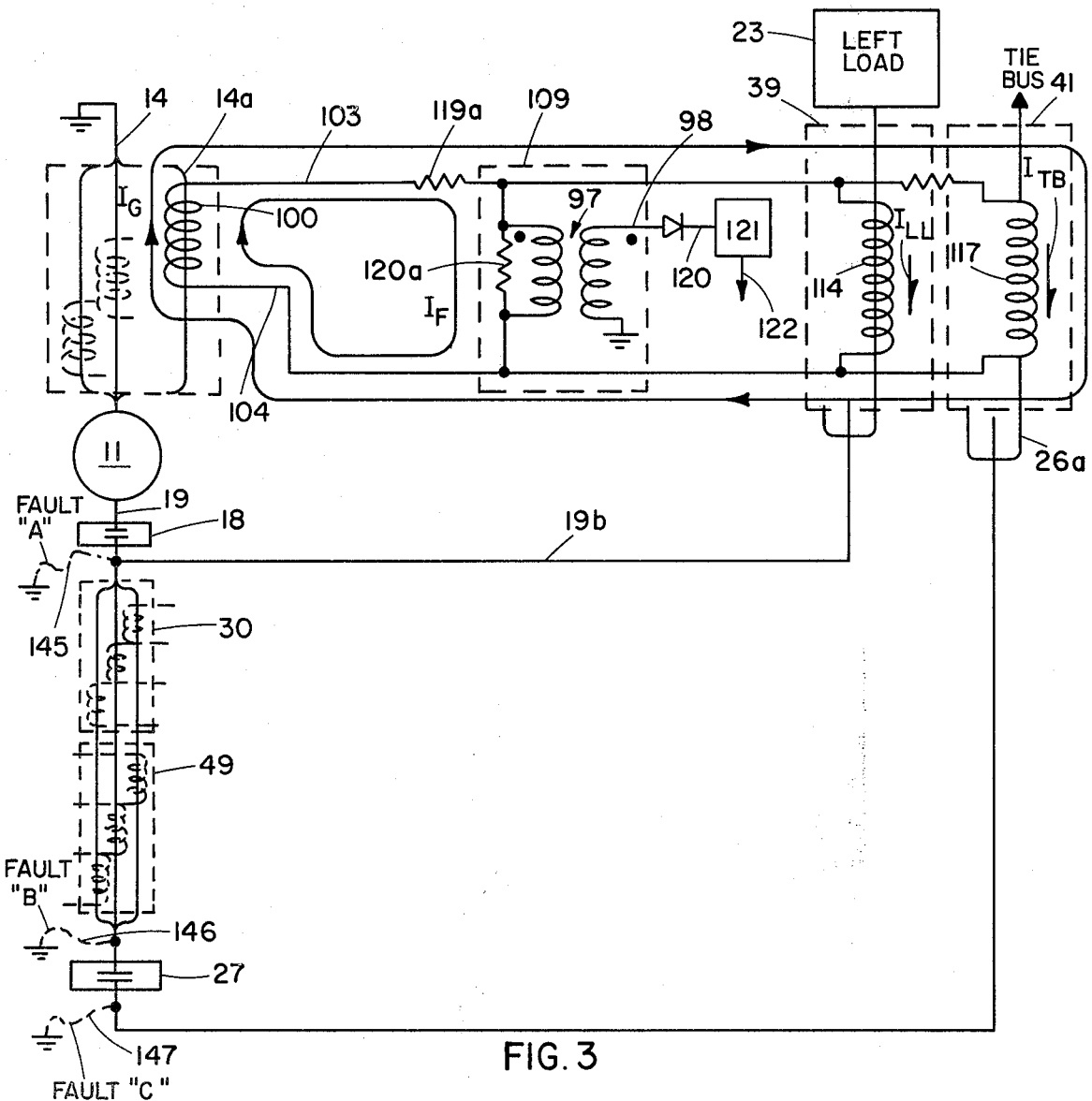
FIG. 3 depicts the circuit details of a single current transformer differential fault current detection circuit of FIG. 1.

Reference is now made to FIG. 1 in which there is illustrated an aircraft electric power generating system that includes in combination therewith, the preferred embodiment of the invention. Due to the complexity of power generating systems of the type here under review, it should be understood that the illustration of FIG. 1 is generally schematic and is intended to convey to those skilled in the art the environment in which the invention finds its utility. FIG. 2 and FIG. 3 to be described more fully hereinafter, set forth in greater detail the essential elements of the differential fault current detection circuit combination and the cooperation of the circuit elements necessary to furnish the reader with an understanding of the invention.

Accordingly, FIG. 1 depicts a power generating system which has a plurality of generators. In an aircraft environment, it is conventional to indicate that generators located on the right wing of the aircraft are right generators and those on the left wing of the aircraft are left generators. For purposes of simplicity, a single left and right generator 11, 12 are shown. These generators are driven by the aircraft's propulsion engines through constant speed drives to provide generator outputs of constant frequency. Typically, the generator outputs are 90KVA.

A third generator 13 is provided to furnish auxiliary power. The auxiliary power unit generator 13 is conventionally driven by a separate engine that is not called upon to furnish propulsion power to the aircraft.

The left generator 11, right generator 12 and auxiliary power unit generator 13 have respectively neutral armature conductors 14, 16 and 17 shown connected to ground. Three neutral armature conductors, one for each phase, are shown schematically by neutral armature conductor reference arrow 14. It is to be understood that the right generator 12 and the auxiliary power unit generator 13 each have three neutral armature conductors though, respectively, only a single conductor 16 and 17 are illustrated.

The left generator 11 is connected to a left generator circuit breaker LGCB 18 by output conductors designated by reference arrow 19. The right generator 12 is connected to a right generator circuit breaker RGCB 21 by output conductors designated by reference arrow 22.

In every aircraft there are a multitude of loads to be served and include a myriad of electrical devices from aircraft running lights, communication equipment and engine control to electrical equipment in the aircraft's galley. These loads are typically divided in half with the left generator 11 providing the primary source of power for what is termed hereinafter as the first load or left load 23. The right generator 12 provides a primary source of power for the second load or right load 24, as it may be termed. It will become evident as the description of the electric power generating system unfolds that the left load 23 or right load 24, with the aircraft in flight, may be powered by either the right or left generators 11, 12 or the auxiliary power unit generator 13. When the aircraft is on the ground, an external power source 15 can be connected to power the loads 23, 24 of the system in a manner to be described more fully hereinafter.

The left generator 11 output conductors 19 can be connected through LGCB 18 to the left load 23 by conductors 19a, 19b.

The right generator 12 output conductors 22 can be connected through RGCB 21 to the right load 24 by conductors 22a, 22b.

A conventional electrical distribution bus 26, hereinafter referred to as bus 26, is provided to furnish a series connection to be described hereinafter from the left generator 11, the right generator 12, the auxiliary power generator 13 or the external power source 15.

The three conductor nature of the distribution bus 26 is depicted on the left of FIG. 1 at 26a.

The left generator 11 may be electrically connected to the bus 26 via output conductors 19, LGCB 18, output conductors 19a, 19c, left bus tie breaker LBTB 27 and bus conductors 26a.

In a similar fashion, the right generator 12 may be electrically connected to the bus 26 via output conductors 22, RGCB 21, output conductors 22a, 22c, right bus tie breaker RBTB 28 and bus conductors 26b.

The auxiliary power unit generator 13 may be electrically connected to the bus 26 via output conductors designated by reference arrow 20, auxiliary power breaker APB 29 and bus conductors 26c.

The external power source 15 may be electrically connected to the bus 26 via external power source conductors 25, external power contactor EPC 31 and bus conductors 26d.

From the above description, it should be apparent that in respect of the left and right loads 23, 24 there are a plurality of power channels available through the various breakers to the respective loads. Without attempting to enumerate all of the possible power channels to the various loads, it should be evident in the schematic electrical generating and power distribution system of FIG. 1 that, for example, the left load 23 could have power channeled to it from the left generator 11 via conductors 19, LGCB 18, and conductors 19a, 19b. The left load 23 with LGCB 18 open could receive power from the right generator 12 through a channel defined by conductors 22, RGCB 21, conductors 22a, 22c, RBTB 28, bus conductor 26b, 26, 26a, LBTB 27, and conductors 19c and 19b.

In a similar fashion, the left load 23 with LGCB 18 and RBTB 28, both open, could have power channeled to it from the auxiliary power unit generator 13 through a channel defined by conductors 20, APB 29, conductors 26c, 26, 26a, LBTB 27, conductors 19c and 19b.

Finally, the left load 23 with LGCB 18, RBTB 28 and APB 29, all open, could have power channeled to it from the external power source 15 via conductors 25, EPC 31, conductors 26d, 26, 26a, LBTB 27, conductors 19c and 19b.

A similar exercise to that just given could be undertaken to explain the multitude of power channels available in the system in respect of the loads and faults. When a fault of the short circuit type appears anywhere in the system, the natural consequence is to unbalance the system. Accordingly, the power source for any given power channel that includes a fault, attempts to supply all the energy the fault or short circuit is calling for. In the event the fault is not isolated quickly, the short circuit of the fault may lead to an electrical fire.

At any given time, there are a predetermined number of regions in the aircraft's electrical system in which a fault may occur and there are a set number of power channels throughout the system to supply power to loads. In a modern aircraft, it is not uncommon to find that there may be at least thirteen regions in which a fault may occur and a like number of power channel configurations of the type described above, available to provide power to the fault located in any given region. Simple arithmetic would indicate that there are 13×13 or 169 fault clearance problems that must be handled quickly leaving as many loads powered, all with a minimum amount of breaker action and attendant time delays.

The details of the invention to be described hereinafter provide a novel solution to the problem of fault detection and fault clearance in even the most complex electrical power generating and distribution systems.

The description that follows is made with respect to FIG. 1 and will identify in the preferred embodiment the location of fault detection circuits. The manner in which the fault detection circuits operate will be set forth in conjunction with the description of FIG. 2 and FIG. 3.

When the electrical system is operating and no faults are present, the current carried by conductors in series should be the same. The presence of a fault with respect to one of the conductors will result in an increase in current drawn by the short circuit of the fault. Current transformers inductively coupled to the conductors of the system will have induced in the transformer windings a current proportional to that existing in the conductor. The circuits to be briefly described now, operate on the principle that a fault detection circuit with two or more transformer couplings to conductors of the system will provide a differential current output only if a fault should arise in respect of a conductor inductively coupled to a current transformer winding of the differential fault current detection circuit.

The first differential fault current detection circuit includes three current transformers diagrammatically illustrated in FIG. 2 as windings 36, 39 and 41; the first of which 36, is inductively coupled to the neutral armature conductors 14 of left generator 11. Electrical lead 37 connects the current transformer winding 36 to a second current transformer winding 39 via a left generator control unit LGCU 38 and lead 40. The second current transformer winding 39 is inductively coupled to the output conductors 19b leading to the left load 23. The third current transformer winding 41 is inductively coupled to the bus conductors 26a and electrically connected to the second current transformer winding 39 by lead 42.

The second differential fault current detection circuit is similar to the circuit just described with respect to the left generator, left load and the bus connections. The second differential fault current detection circuit includes first, second and third current transformers diagrammatically shown in FIG. 2 as windings 43, 44 and 45 inductively coupled respectively to neutral armature conductors 16 to output conductors 22b and to bus conductors 26b.

The first and second differential fault current detection circuits provide outputs used in the power control logic network 71, which outputs are indicative of a fault detected between the neutral armature windings 14, 16 respectively of the left generator 11 and right generator 12, the left load 23 and right load 24 and the bus 26.

The third differential fault current detection circuit includes two current transformers diagrammatically shown in FIG. 2 as windings 46, 47, the first of which 46, is inductively coupled to the neutral armature winding 17 of the auxiliary power unit generator 13 and the second of which 47 is inductively coupled to bus conductors 26c. The third differential fault current detection circuit provides an output indicative of a fault detected between the neutral armature winding 17 of the auxiliary power unit generator 13 and the bus 26.

The fourth differential fault current detection circuit includes four current transformer windings 49, 50, 51 and 52 respectively, inductively coupled as shown to left generator 11 output conductors 19c, right generator 12 output conductors 22c, auxiliary power unit 13 output conductors 20 and external power source conductors 25. The current transformer windings 49, 50, 51 and 52 are shown respectively interconnected by leads 53, 54 and 55.

The fourth differential fault current detection circuit provides an output on lead 56 which is indicative of faults detected between respectively the left load 23 and LBTB 27, the right load 24 and RBTB 28, the auxiliary power unit generator 13 and APB 29, and between the external power source 15 and the EPC 31. In addition, the fourth differential fault current detection circuit provides an output indicative of a fault that appears at any point in the distribution bus 26. The fourth differential fault current detection circuit output lead 56 provides an input to a bus power control unit BPCU 72 of power control logic network 71.

In the preferred embodiment of the invention, there are included in the combination fifth and sixth current detection circuits which do not operate on a differential current principle but utilize inductively coupled transformer windings adjacent conductors to determine current level in the conductors. The current level is measured and compared with a reference signal. The details of these fifth and sixth current detection circuits, which are also referred to as overlap current detection circuits, will be set forth hereinafter in detail.

The fifth current detection circuit provides for overlap current detection and includes a current transformer winding 30 inductively coupled to left generator 11 output conductors 19c. The current transformer winding 30 has an output delivered to LGCU 38 over lead 32.

The sixth current detection circuit provides for overlap current detection and includes a transformer winding 33 inductively coupled to right generator 12 output conductors 22c. The current transformer winding 33 has an output delivered to RGCU 34 over lead 35.

The fifth and sixth overlap current detection circuits just described, because of their location in the system, provide outputs indicative of a predetermined current level detected respectively in a power channel to the left load 23 from the right generator 12 and the auxiliary power unit generator 13, and in a power channel to the right load 24 from the left generator 11 and the auxiliary power generator 13.

In the preferred embodiment of FIG. 1, there are a total of six circuit breakers shown; namely, LGCB 18, RGCB 21, LBTB 27, RBTB 28, APB 29 and EPC 31, all which have in common a breaker condition detection means which takes the form of an additional pair of breaker contacts in five of the six breakers. Accordingly, LGCB 18 has additional breaker contacts 60, 61; RGCB 21 has additional breaker contacts 62, 63; LBTB 27 has additional breaker contacts 64, 65; RBTB 28 has additional breaker contacts 66, 67; APB 29 has additional breaker contacts 68, 69; and finally, EPC 31 has a single additional breaker contact 70. The additional breaker contacts 61, 63, 65, 67, 69 and 70 of LGCB 18, RGCB 21, LBTB 27, RBTB 28, APB 29 and EPC 31 are respectively electrically connected to BPCU 72 of power control logic network 71 by leads 74, 76, 78, 80, 82, and 83. Additional breaker contacts 60, 62 are connected respectively by leads 73, 75 to LGCU 38 and RGCU 34. Additional breaker contacts 64, 66 are connected respectively by leads 77, 79 to LGCU 38 and RGCU 34. Finally, additional breaker contact 68 is connected by lead 81 to APGCU 35.

The breaker condition detection means associated with each breaker provides an output indicative of the breaker's condition, i.e., "open" or "closed".

Each of the six breakers shown in FIG. 1 includes a breaker control means in the form of a solenoid connected to the circuit breaker to effect a circuit breaker closing.

Illustrated in a schematic form are independently controllable circuit breaker control means 85, 86, 87, 88, 89 and 90 included respectively with LGCB 18; RGCB 21; LBTB 27; RBTB 28, APB 29 and EPC 31.

Circuit breaker control means 85 and 87 are controlled respectively over leads 91 and 92 from LGCU 38. Circuit breaker control means 86 and 88 are controlled respectively over leads 93, 94 from RGCU 34. The APB 19 circuit breaker control means 89 is controlled over lead 95 from APGCU 35 and EPC 31, circuit breaker control means 90 is controlled over lead 96 from BPCU 72.

The power control network 71 includes, as has been indicated, the BPCU 72, the LGCU 38, the RGCU 34 and the APGCU 35 all interconnected as shown to the BPCU 72. The power control logic network 71 provides control signals on leads 91, 92, 93, 94, 95 and 96, respectively to breaker control means 85, 87, 86, 88, 89 and 90, to control breaker action in a programmed manner in response to faults detected within the system.

The detection of faults and the programmed manner in which the breaker control means are operated will be more readily understood when the remaining figures are described and explained.

A number of detection circuits have been described each of which provides a signal output indicative of the presence of a differential fault current or of the presence of a current above a predetermined level. In addition to these signals which are essential to the power control logic network ability to make decision, there is another signal essential to the logic. This signal is generated by the BPCU and is referred to as tie bus lockout signal TBLO. This signal appears on leads 140, 143, 144 from the BPCU 72 to respective LGCU 28, RGCU 34 and APU 13. The TBLO signal represents a single bit of information generated in BPCU 72. When the TBLO signal is true, it indicates that a differential current fault has been identified as existing for 4 to 12 milliseconds in the region 145 shown in dotted outline in FIG. 1. The region 145 intersects LBTB 27, RBTB 28 and totally includes APB 29, EPC 31 and bus 26.

When TBLO goes true, it indicates to all controllers, i.e., LGCU 38, RGCU 34, APU 35 and BPCU 72 that all breakers LBTB 27, RBTB 28, APB 29 and EPC 31, should be opened immediately. It should be noted that BPCU 72 has control over the EPC 31 via lead 96.

There remains yet another fault signal which is termed an overlap fault signal and this signal is generated in LGCU 38, RGCU 34, APGCU 35 and is delivered to BPCU 72. The details of the circuits present in each GCU, which generate the overlap fault signal, are of the type shown in FIG. 2 in respect of LGCU 38. The overlap fault signals appear on leads 128, 128a, 128b respectively from LGCU 38, RGCU 34 and APGCU 35.

The overlap fault signal is defined as a single bit of information that when true indicates that there is a differential fault current in respect of any given generator power channel, between the BTB and the differential fault current transformer circuit on the bus 26 for the particular power channel.

The differential fault current signal is also referred to as a differential protection signal DP. The DP signal is also delivered to the BPCU from LGCU 38 and RGCU 34, respectively via leads 126a and 126b.

Reference is now made to FIG. 2 which illustrates basic circuit details taken from the system of FIG. 1 sufficient to explain the operation of the invention. It will become apparent to the reader as the description unfolds that the description of FIG. 2 is a simplified version of the relatively complex arrangement of the preferred embodiment of the invention.

The description that follows is intended to be merely explanatory of the operation of the basic components of the combination and the cooperative relationship of the basic components, one with the other, which results in a new and highly improved fault detection and fault clearing system for use in an electric power generating and distribution system.

Figure 4:
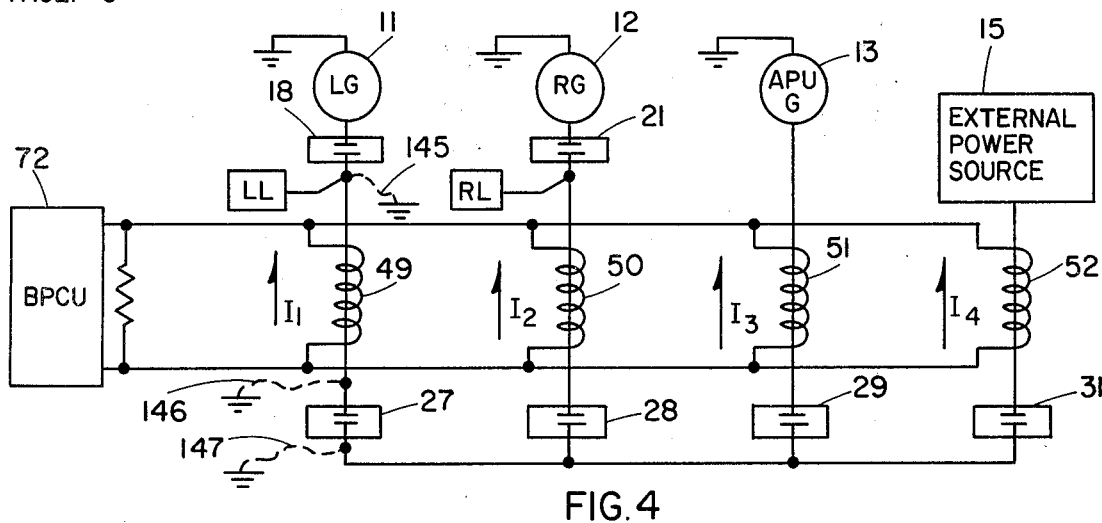
FIG. 4 illustrates the basic circuit components of the bus tie differential current detection circuit of FIG. 1.

In the description of FIG. 2, FIG. 3 and FIG. 4 where the reference numerals of FIG. 1 relate to the same component, the same reference numerals will be applied to like components.

FIG. 2 illustrates a fault detection system for use in a power generating system having multiple generators 11, 12 and 13.

The basic system, described here, includes a first generator here designated as left generator 11 and a second generator which may be either right generator 12 or auxiliary power unit generator 13. The term "basic system" is intended to convey the idea that while FIG. 1 illustrates an entire system typical of an aircraft environment, the utility of the invention emerges when there is less than an entire system. It will be appreciated that while FIG. 2 illustrates the entire system, the basic components of the invention arise in fewer components of the system. It will be recalled that the entire system describes a total of four current transformer circuits for differential fault current detection and for two detection circuits for overlap current detection. In the description that follows, it will be seen that the invention is present when, for example, the first and fourth current transformer and the fifth detection circuit for overlap current detection are involved.

The left generator 11 has neutral armature conductors 14 and output conductors 19. Both right generator 12 and APU generator 13 have respectively output conductors 22 and 20. The left generator 11 is connected through output conductors 19, LGCB 18, and conductors 19a, 19b to a left load 23. The left generator 11 output conductors 19 are also connected to one side of LBTB 27 via conductors 19a, 19c.

From the description of FIG. 1, it will be recalled that right generator 12 or APU generator 13 may have their respective outputs connected via the tie bus 26 to the other side of LBTB 27.

The first current transformer circuit for differential fault current detection as illustrated in FIG. 2 includes current transformers 36, 39 and 41 in association with a summing circuit 109.

The first current transformer 36, here shown in dotted outline, is inductively coupled to neutral armature conductors 14. The generators of the system provide three phase power. The first current transformer includes three current transformer windings 100, 101, 102 inductively coupled to the neutral armature conductors 14. Extending to the right of the first current transformer 36 there are electrical leads 103, 104, 105, 106, 107, 108 with leads 103, 105, 107, 108 terminating on one side of a summing circuit 109 shown in dotted outline. Shown directly beneath the summing circuit 109 and connected by leads 110, 111, 112, 113 is second current transformer 39 inductively coupled to output conductors 19b. The second current transformer 39 has individual current transformer windings 114, 115, and 116. The individual transformer windings 114, 115, and 116 are inductively coupled to output conductors 19b which are connected to left load 23. A third current transformer 41 includes individual current transformer windings 117, 118 and 119. The individual transformer windings 117, 118 and 119 are inductively coupled to bus conductor 26a as shown. Burden resistors 149a, 149b, 149c, 122, 123, and 124 are respectively shown in leads 103, 105, 107, 113, 112 and 111. A burden resistor 149d is shown in a lead not referenced between lead 103 and lead 108.

The operation of the first current transformer circuit for differential fault current detection will be described in detail with respect to the discussion of FIG. 3, hereinafter. At this point in the description of FIG. 2, it is sufficient to note that the first current transformer circuit provides a signal output on lead 120 proportional to a differential current detected between one of the neutral armature conductors 14 of left generator 11 relative to the sum of the currents in corresponding conductors of the output conductors 19, 19a, 19b, 19c and the bus conductors 26a.

The summing circuit 109 output appears on lead 120 to resettable peak holding circuit 121. An explanation of the operation of the summing circuit 109 will be made hereinafter in the discussion of FIG. 3. The signal from the summing circuit 109 after processing by resettable peak holding circuit 121 is delivered over lead 122 to sample and hold circuit 123, and thence over lead 124, to comparator 125 with a 20 amp reference and finally to lead 126 where a differential protection signal DP is delivered to control logic 127. The control logic 127 is fashioned of conventional solid state logic components interconnected to provide logic decisions, set forth in logic flow diagrams of FIGS. 10 thru 12, explained more fully hereinafter. The DP signal represents a single bit of information. When the information is true, it indicates that there is a differential fault current in one of the power channels to the left load.

The fourth current transformer circuit for differential fault current detection includes a first, second, third and fourth current transformer windings 49, 50, 51 and 52 shown schematically interconnected in FIG. 2 by leads 53, 54, 55. The single phase details of the current transformer windings 49, 50, 51 and 52 interconnection is shown in FIG. 4. This second current transformer circuit provides distribution bus differential fault current protection or tie bus differential fault current protection TBDP, as it may be termed. When a signal indicative of a tie bus differential fault current TBDP appears on lead 56 to the BPCU 72 a single bit of information indicative of TBDP is generated in the BPCU 72 and is delivered over lead 130 to LGCU 38 and its microcomputer 128 shown in dotted outline. When this TBDP signal is true, it indicates that there is a differential fault current present in the bus 26 and up to the current transformers 49, 50, 51, 52. In FIG. 1, the TBDP signal is also shown present on lead 130a from BPCU 72 to RGCU 34.

The fifth current transformer circuit for simple current presence detection includes overlap current transformer 30 and comparator circuit 129 shown in dotted outline. Individual overlap current transformer windings 131, 132, and 133 make up overlap current transformer 30 and are respectively inductively coupled to each phase of left generator 11 output conductors 19c through LGCB 18. This fifth current transformer circuit is termed an overlap load detection circuit for reasons that will become apparent hereinafter. The circuits for each phase are simple in that, for example, the current in any one of the output conductors 19c will induce a current in the associated circuits. For example, the current in one of the conductors 19c inductively coupled to transformer winding 131, will cause a current to appear in the circuit represented by lead 134, burden resistor 135 and lead 136. The current passing through burden resistor 135 will induce a current across transformer 137 which will be seen by comparator 138a. In the preferred embodiment of the invention, comparators 138a, 138b, 138c of comparator circuit 129 are set such that there will be an output indicated whenever there is greater than 10±4 amperes flowing through the current transformer 131, 132, 133. The output from the comparator circuit 129 is delivered to resettable peak holding circuit 139 and thence over lead 140 logic gate 141 to sample and hold circuit 142 of the microcomputer 128 which provides an output to the control logic 127. The signal delivered to the control logic indicative of an overlap load is cryptically termed O'LAPLD. When O'LAPLD is true, it indicates that there is greater than 10±4 amperes flowing through overlap current transformer 131, or 132 or 133. It should be understood that the fifth detection circuit is not a fault detection circuit. This fifth detection circuit only detects current levels in conductors for the purpose of providing an additional input to decision producing control logic 127. The sixth detection circuit operates in a similar fashion to the fifth detection circuit.

LGCB 18 has auxiliary contact 60 connected by lead 73 through an inverting logic gate not referenced to the control logic 127 of microcomputer 128. The signal from auxiliary contact 60 is termed LGCB AUX. When LGCB AUX is true, a single bit of information delivered to the control logic 127 of microcomputer 128 indicates that the LGCB 18 is closed.

LBTB 27 has auxiliary contact 64 connected by lead 77 through an inverting logic gate not referenced to the control logic 127 of microcomputer 128. The signal from auxiliary contact 64 is termed LBTB AUX. When LBTB AUX is true, a single bit of information delivered to the control logic 127 indicates that LBTB 27 is closed.

The control logic 127 has a pair of outputs which appear on leads 91, 92 which leads include drivers 99a, 99b. Leads 91, 92 are respectively connected to circuit breaker control means 85, 87. The control logic 127 includes a control logic network that is responsive to the differential fault protection signals from the first and second current transformer circuits, the auxiliary contact condition outputs overlap load signal and the tie bus lockout signal. The control logic 127 outputs on leads 91, 92 control circuit breaker control means 85, 87 to clear faults detected in that portion of the system shown in detail in FIG. 2.

Reference is now made to FIG. 3 which shows in detail a single current transformer differential fault current detection circuit for a single phase of left generator 11. FIG. 3 also includes only so much of the systems circuitry as is needed to explain the nature of the operation of a differential fault current detection circuit. A fault 145 is shown in dotted outline at fault location "A".

The circuit of interest includes three current transformers windings 100, 114 and 117 inductively coupled respectively to a conductor 14a of the neutral armature winding conductors 14, output conductor 19b and to the left load and bus conductor 26a.

In accordance with Kirchoff's law under a nofault condition, the following is true:

$$I_G = I_{LL} + I_{TB} \qquad (1)$$

and $$I_{Fault\,(F)} = I_G - (I_{LL} + I_{TB}) = 0 \qquad (2)$$

With a fault present as indicated above, the following states the current relationship:

$$I_G > I_{LL} + I_{TB} \qquad (3)$$

In the preferred embodiment of the system, a significant fault current is considered present only when:

$$I_F > 20 \pm 5 \text{ amperes} \qquad (4)$$

In respect of this fault current, it should be understood that the invention is not limited to a fault current of 20 amperes±5 amperes, the fault current selected could be higher or lower depending upon the sensitivity desired.

Accordingly, when:

$$I_F = I_G - (I_{LL} + I_{TB}) > 20 \pm 5 \text{ Amps} \qquad (5)$$

the system recognizes the presence of a fault current.

The $I_F$ across burden resistor 120a induces across the transformer windings 97 of summing circuit 109 a voltage signal directly proportional to $I_F$ which signal appears in lead 98 and is passed through a diode, not referenced, to lead 120 and the resettable peak holding circuit 121.

The first and second current transformer circuits described heretofore operate in the manner just described.

The principle of operation of the third current transformer circuit is the same. Reference is now made to FIG. 4 which illustrates the basic elements of the system heretofore identified. FIG. 4 is primarily directed to the basic circuit components of the third current transformer circuit that are included in the distribution or tie bus differential fault current detection circuits 49, 53; 50, 54; 51, 55; 52, 56 of FIG. 1.

Under a nofault condition, the following is true:

$$I_1 + I_2 + I_3 + I_4 = 0 \qquad (6)$$

The fault 145 would not be seen by the third current transformer circuit. However, should a fault 146 at fault location B or a fault 147 at location C appear and the fault current exceed the system fault current sensitivity detection parameter, that is if:

$$|I_1 + I_2 + I_3 + I_4| > 20 \pm 5 \text{ amps} \quad (7)$$

we have a tie bus differential fault (TBDP).

In order that fault current detection and fault clearing capabilities of the system are understood, the basic elements of the system as shown in FIG. 2 will be described with the presence of faults 145, 146, 147 respectively at fault locations A, B and C. A variety of circuit breaker conditions will be considered in the analysis that follows in which FIG. 5 through FIG. 9 depict in real time, the sequence of events within the system when a fault has been detected. In each of the FIGS. 5 to 9, the vertical axis depicts the various fault detection circuit outputs described above. The horizontal axis represents the passage of real time in milliseconds. The curves depicted are all square wave in nature.

Figure 5:
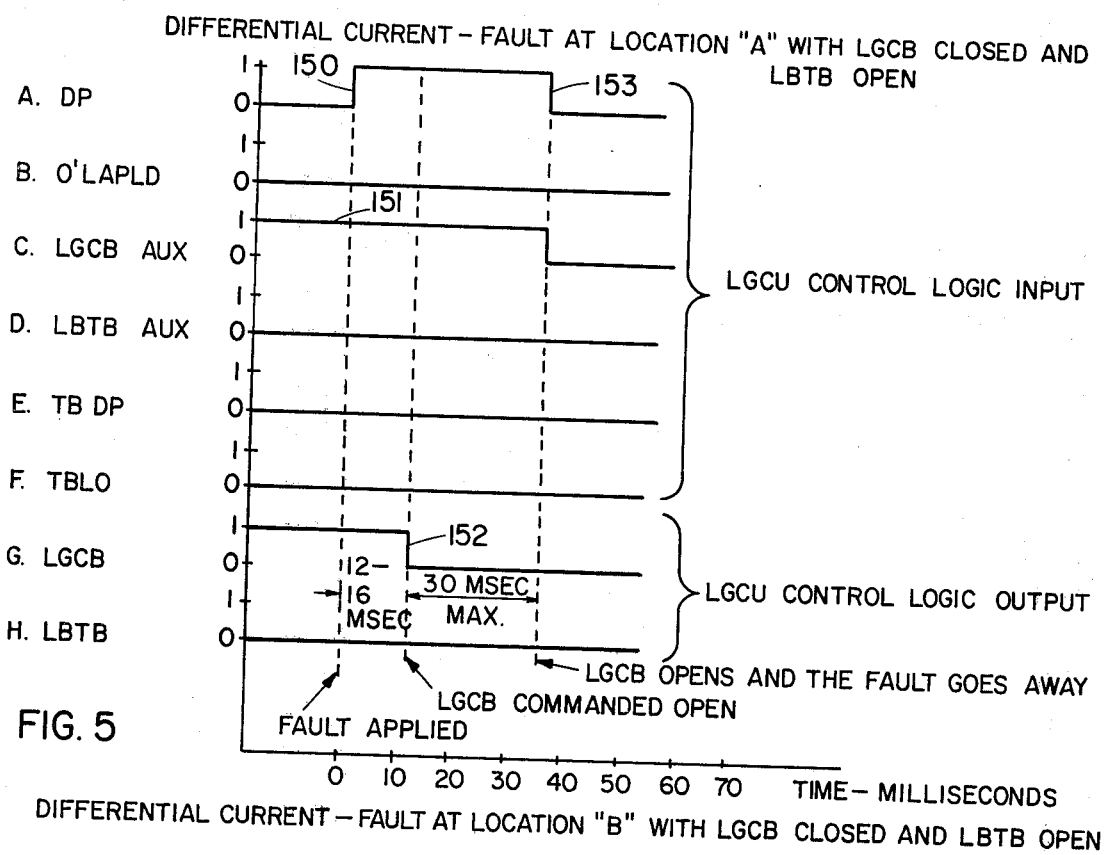
FIG. 5 is a timing chart of signals delivered to and from the control logic of FIG. 2 for a fault at location A.

Reference is now made to FIG. 5 which illustrates the sequence of events when a fault 145 at location "A" is present with LGCB 18 closed and LBTB 27 open. The control logic 127 will receive from the first current transformer circuit an output that can be seen on line A as indication of fault at point 150. The control logic sees also, that as shown on line C at the same instant, that the LGCB AUX at point 151 is in a closed condition. These two true conditions coupled with the conditions as shown in lines B, D, C and F cause the control logic 127 to provide the output as shown on line G to open the LGCB 18 as indicated by point 152. The system is designed such that within 30 milliseconds, the fault goes away (is disconnected) as seen on line A at point 153.

When a fault occurs as just described, the system embodying the invention operates in a manner unlike the systems of the prior art. The prior art system would not use information indicative of LBTB condition, i.e., open or closed, to effect fault clearance. The system of this invention has circuit breaker condition detection means in the form of an auxiliary contact 64 in the LBTB 27 which provides control logic 127 with an indication of the open or closed condition of the LBTB 27. In a prior art system, the first command that might be expected would be one which would attempt to open the system LBTB. The system of the prior art would then go on to open the LGCB. The invention herein being described, reduces the time necessary to detect and clear the fault by avoiding the needless opening or attempted opening of breakers not necessary to clear the fault.

Figure 6:
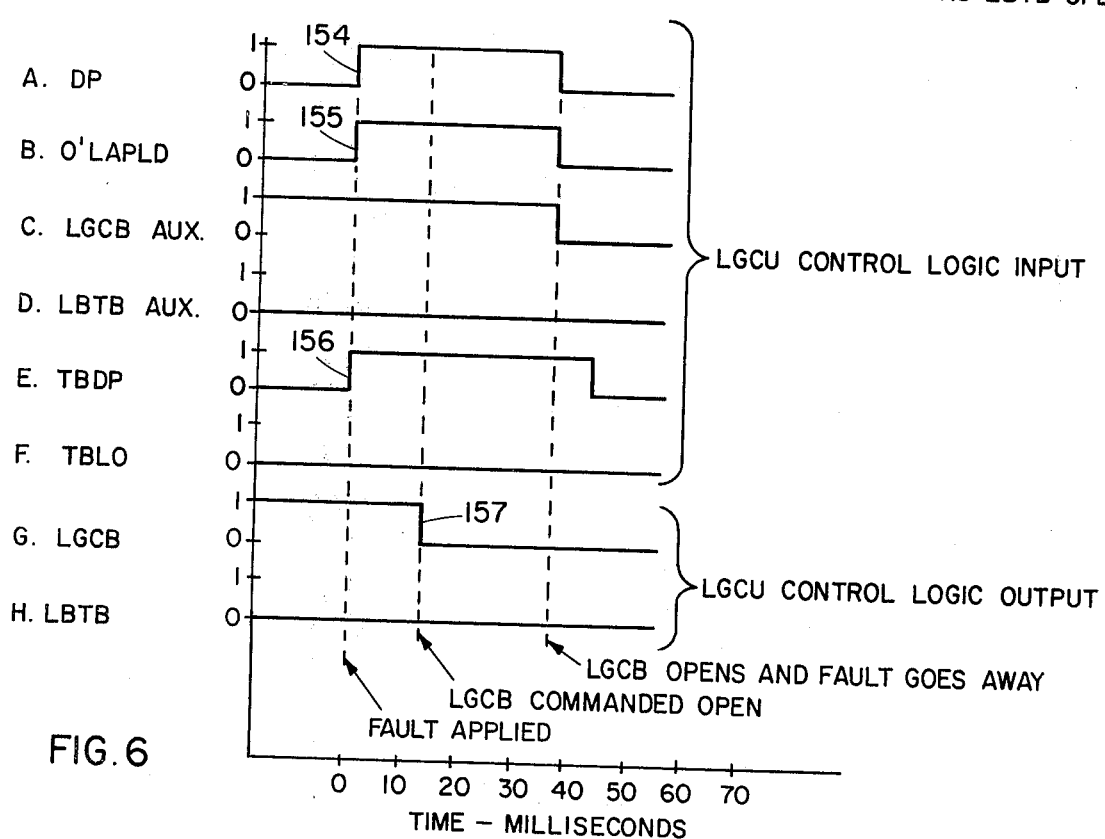
FIG. 6 is a timing chart of signals delivered to and from the control logic of FIG. 2 for a fault at location B under one set of breaker conditions.

Reference is now made to FIG. 6 which illustrates the sequence of events that arise when a fault 146 at location "B" is present with LGCB 18 closed and LBTB 27 open. The first current transformer circuit provides an output to the control logic 127 as is indicated on line A by the signal going true as shown at point 154. The presence of the fault at location "B" will result in an overlap current detection (O'LAPLD) by current transformer windings 30 and the generation of an O'LAPLD signal by comparator circuit 129 as shown on line B by the signal going true at point 155 on the curve.

Line D in respect of LBTB AUX indicates that LBTB is open. At line E in respect of the TBDP signal, it is seen that coincident in time with the appearance of the fault at location "B" the current transformer circuit which includes transformer 49 has detected a differential fault current as indicated by the signal going true at point 156 on the curve.

The control logic 127 with DP, O'LAPLD, LGCB, and TBDP all true provides a command on lead 91 to open LGCB 18 as shown on line G at point 157.

Figure 7:
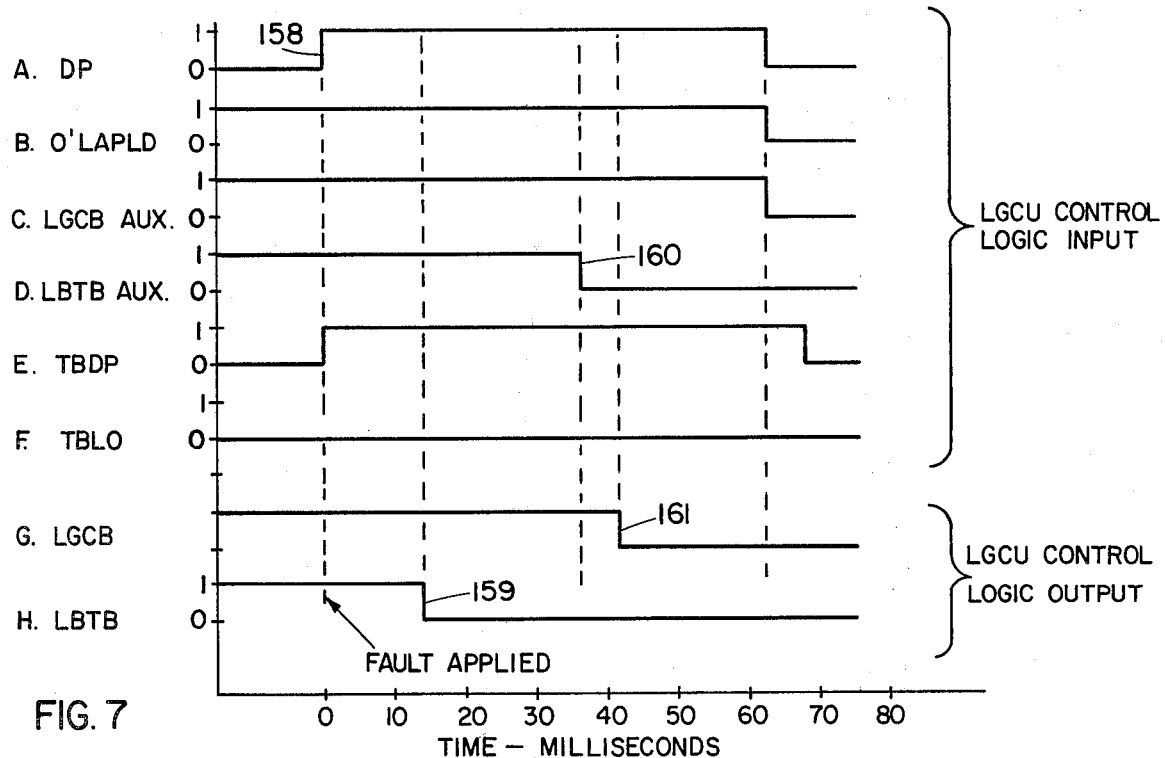
FIG. 7 is a timing chart of signals delivered to and from the control logic of FIG. 2 for a fault at location B under another set of breaker conditions.

Reference is now made to FIG. 7 which illustrates the sequence of events when a fault 146 is present at location "B" with LGCB 18 closed and LBTB 27 closed. FIG. 7 differs from FIG. 6 in a number of ways. For example, at line B, O'LAPLD current detection is shown as true at point 158 which is to be expected with LBTB 27 closed and current flowing through conductors 19c to and through LBTB 27 to bus 26. At line D, LBTB AUX is shown true as would be expected with LBTB 27 closed. The control logic 127 provided with the inputs of lines A through F first provides an output on lead 92 to LBTB 27 as shown at point 159 of the curve of line H, whereupon LBTB 27 is commanded opened. The opening of LBTB is indicated on the curve of line D at point 160. Thereafter, the inputs to control logic 127 are changed insofar as the LBTB AUX input is concerned and the control logic 127 provides an output command on lead 91 to LGCB 18 to open as shown on the curve of line G at point 161 and the fault is cleared.

Figure 8:
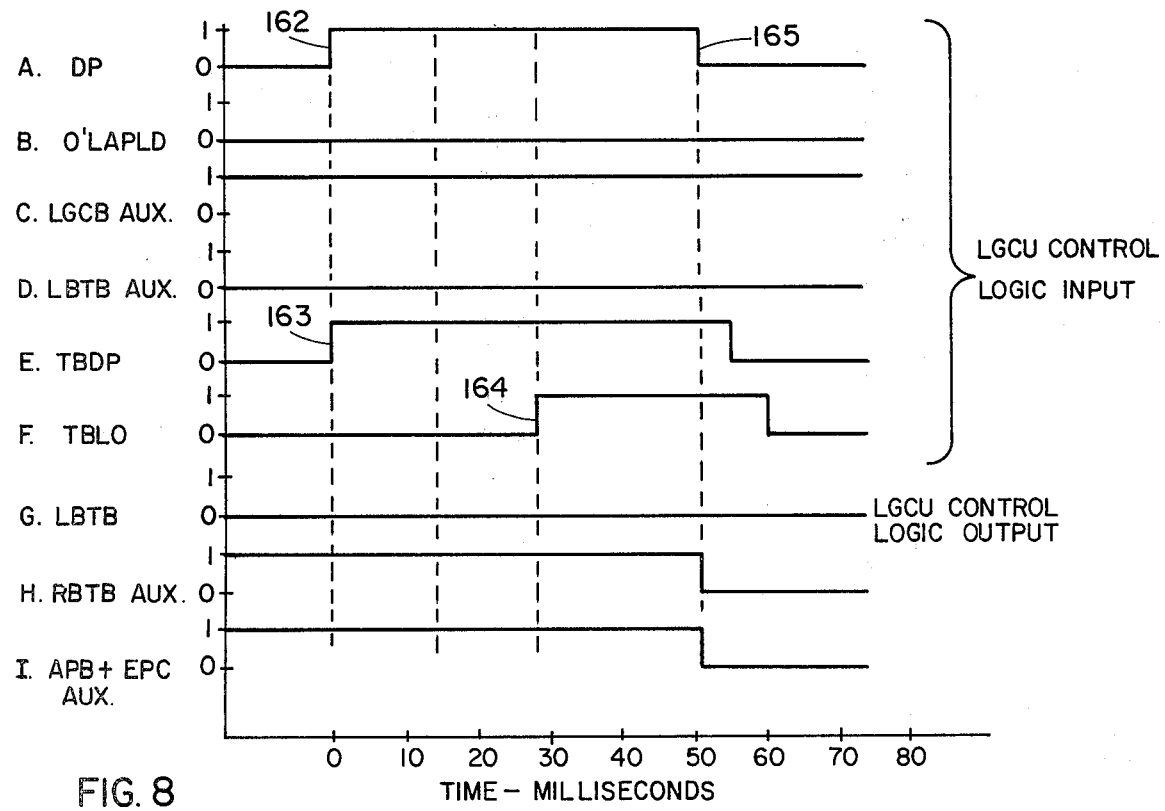
FIG. 8 is a timing chart of signals delivered to and from the control logic of FIG. 2 as well as other components of the system for a fault at location C.
Figure 9:
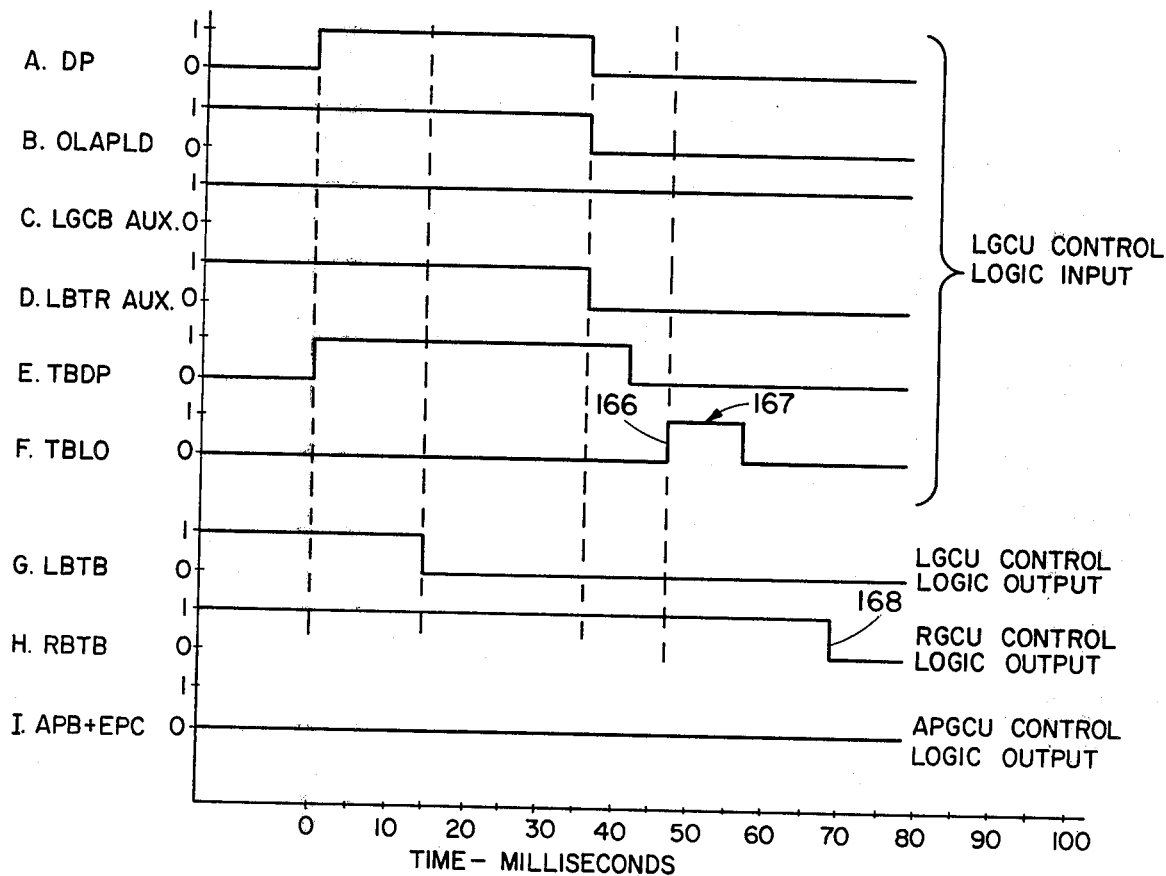
FIG. 9 is a timing chart of signals delivered to and from the control logic of FIG. 2 as well as other components of the system for a differential current fault at location C under another set of breaker conditions.

Reference is now made to FIG. 8 and FIG. 9 which illustrate the sequence of events that arise when a fault 147 is at fault location "C". In the description of the systems operation up to this point, all fault detection and command controls sufficient to provide for fault clearance could be explained by reference to the basic system shown in expanded detail in FIG. 2. The description that follows in respect of fault detection and fault clearance of a fault at location "C" will of necessity entail the cooperative inclusion of other elements of the total system depicted to the right in FIG. 2 in general schematic form. The presence of the fault 147 in the bus 26 will, as the description unfolds, reveal that the breakers to be controlled are the breakers on the tie bus LBTB, RBTB, APB and EPC.

Reference is now made to FIG. 8 which illustrates the sequence of events when fault 147 is present at location C with LGCB 61 closed and LBTB 27 open. The first current transformer circuit provides an output to the control logic 127 when the fault 147 appears as is indicated on line A by the signal going true at point 162. With a fault at location "C" and LBTB 27 open, no current will flow through conductors 19c and as indicated at line B, no O'LAPLD signal is present. As would be expected with LGCB 18 closed the condition of the LGCB AUX signal of line C will be be true and conversely with LBTB 27 open, the LBTB AUX signal of line D would not be true.

At line E in respect of the TBDP signal, which signal is generated by the BPCU 72, it is seen that coincident in time with the appearance of the fault at "C", the current transformers differential current circuit which includes current transformers 49, 50, 51, and 52 has detected a differential fault current DP as indicated by the signal going true at point 162 on the curve of line A.

At the time the fault at "C" occurs, there is no TBLO signal present as is shown on line F.

Although not shown as a separate curve, the left overlap fault signal which appears on lead 128 goes true 12 to 16 milliseconds (hereinafter written as "msec") after the fault has been applied. Thereafter, within 6 to 12 msec, the TBLO originating in the BPCU 72 goes true as indicated at point 164 of the TBLO curve, line F.

This true condition of the TBLO results in the APB 29 and the EPC 31 being commanded open as a result of a logic decision made jointly by LGCU 38, RGCU 34, APGCU 35 and the BPCU 72. Within 30 msec as seen on line A at point 165, the fault goes away. The resultant condition present at LBTB 27, RBTB 28, APB 29 or EPC 31 is as shown on lines G, H and I, respectively as LBTB, RBTB AUX and APB AUX OR EPC AUX.

Reference is now made to FIG. 9, which illustrates the sequence of events when fault 147 is present at location "C" with LGCB 18 and LBTB 27 both closed. The conditions represented on line A of FIG. 9 are the same as those described with reference to FIG. 8, line A.

The conditions present in the system as shown on line B are different from FIG. 8 in that with LBTB 27 closed, current will flow through conductors 19c and an overlap current O'LAPLD will be indicated as is shown by the true condition of the O'LAPLD signal on line B.

Line C indicative of LGCB AUX remains true because the LGCB 61 is closed as stated above.

At point 166 on the TBLO curve of line F, there is shown the TBLO signal going true. The pulse formed 167 is generated in the BPCU 72 on the basis of information received from the GCU'S, right, left and auxiliary. The signal 167 tells all breakers there is a fault in the region 144 of FIG. 1 and that all breakers should open.

Accordingly, it will be noted that RBTB signal on line H at point 168 is negative going and RBTB is not true which is indicative of the fact that RBTB 28 is open.

Line I is included only to show that the APB 29 or the EPC 31 are, for purposes of this example, in an open condition.

FAULT ISOLATION IN PREFERRED EMBODIMENT

Figure 10:
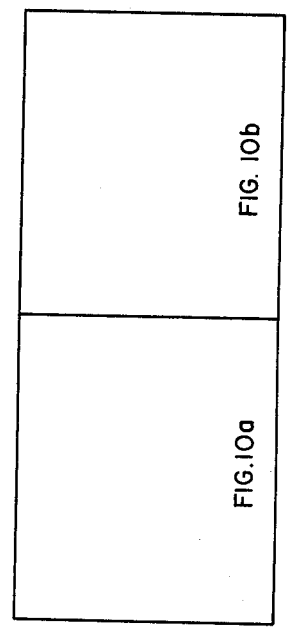
FIG. 10 is made up of FIG. 10a and FIG. 10b as shown, and illustrates a flow chart timing diagram depicting the differential fault current detection and isolation function of either the right or left generator control units of FIG. 1.
Figure 10A:
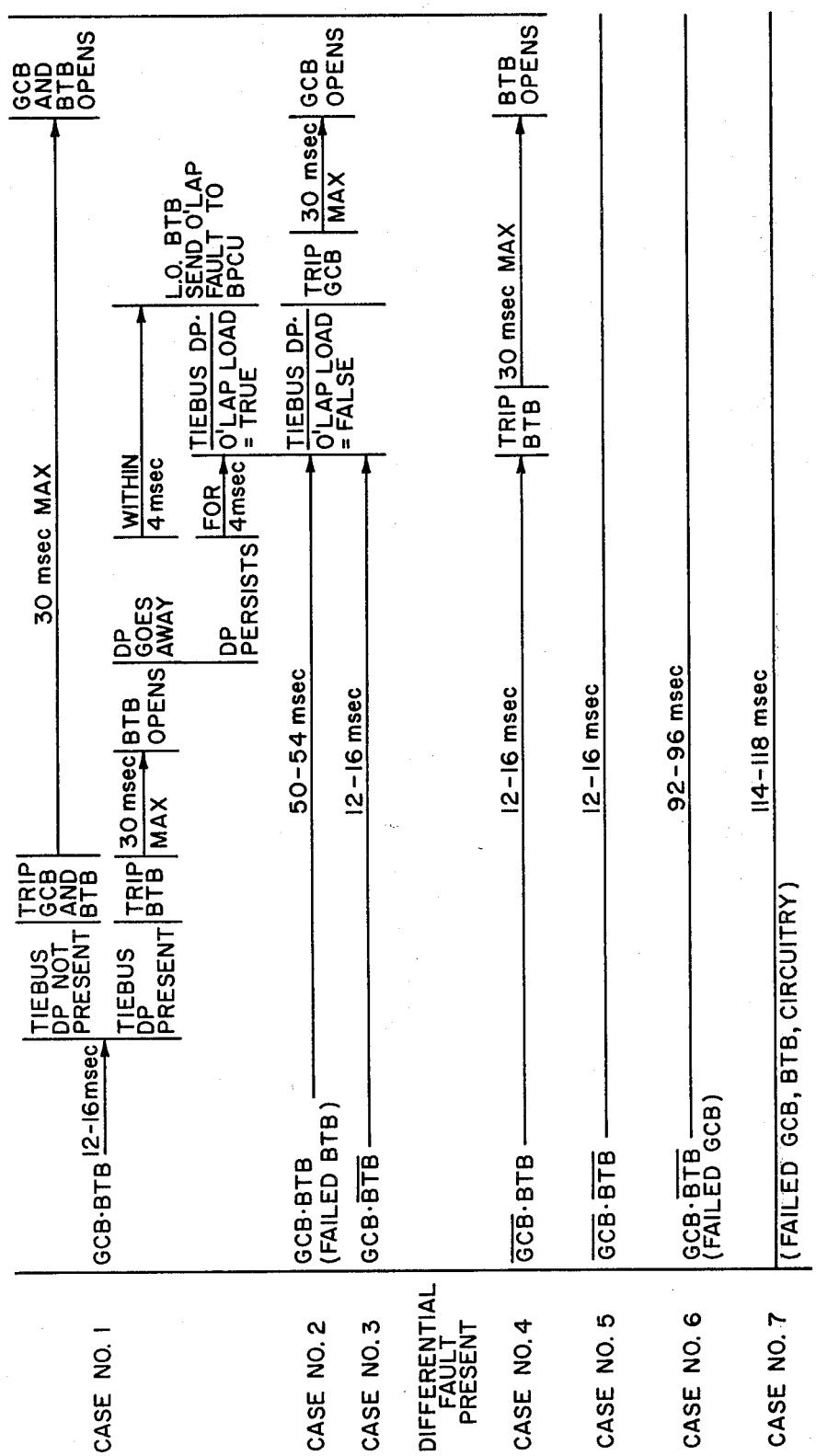
Figure 10B:
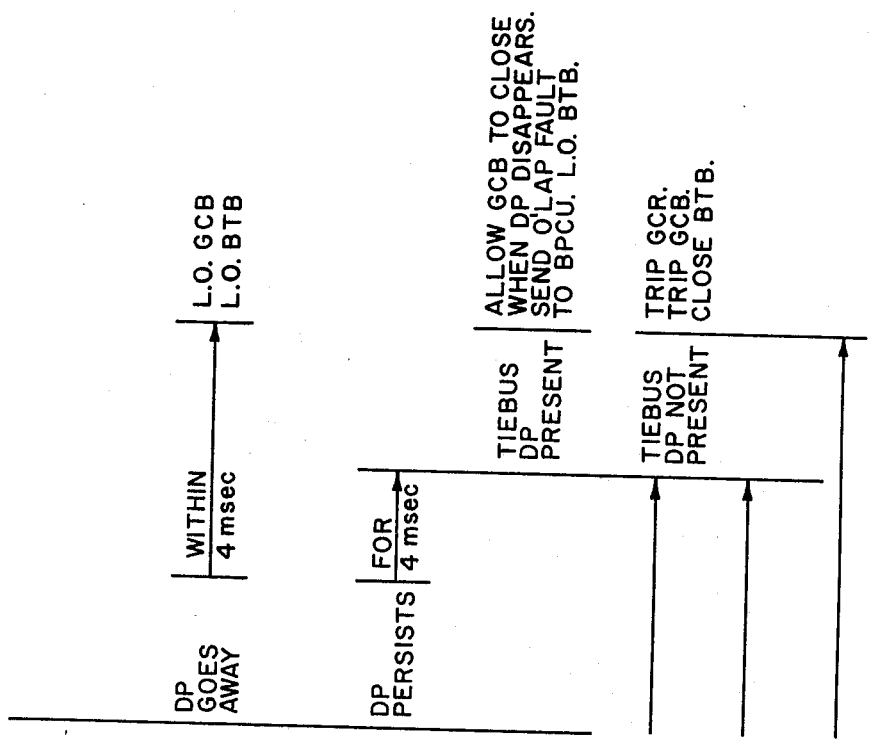
Figure 11:
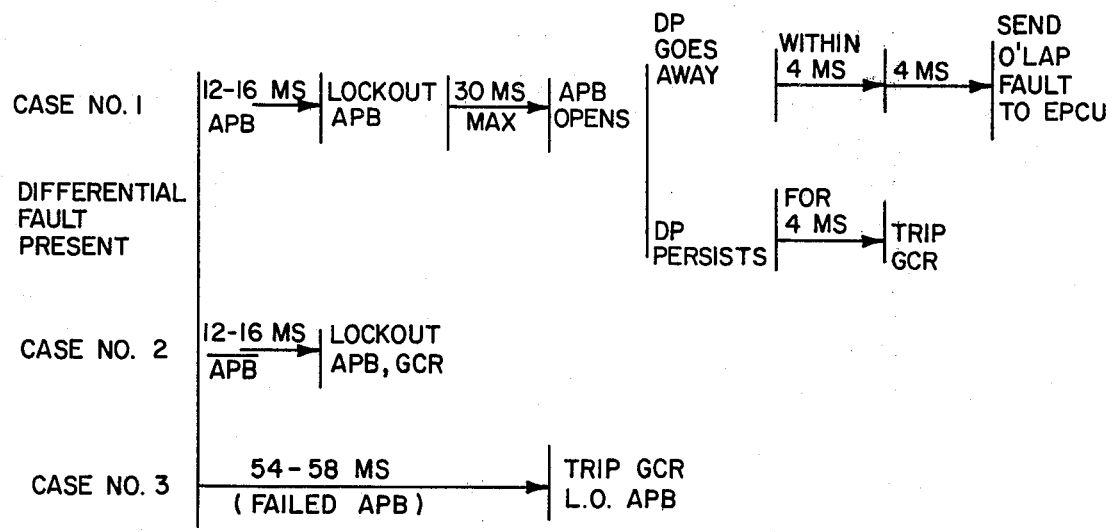
FIG. 11 is a micro auxiliary power generator control unit differential fault current detection and isolation flow diagram for the auxiliary power generator control unit of FIG. 1.
Figure 12:
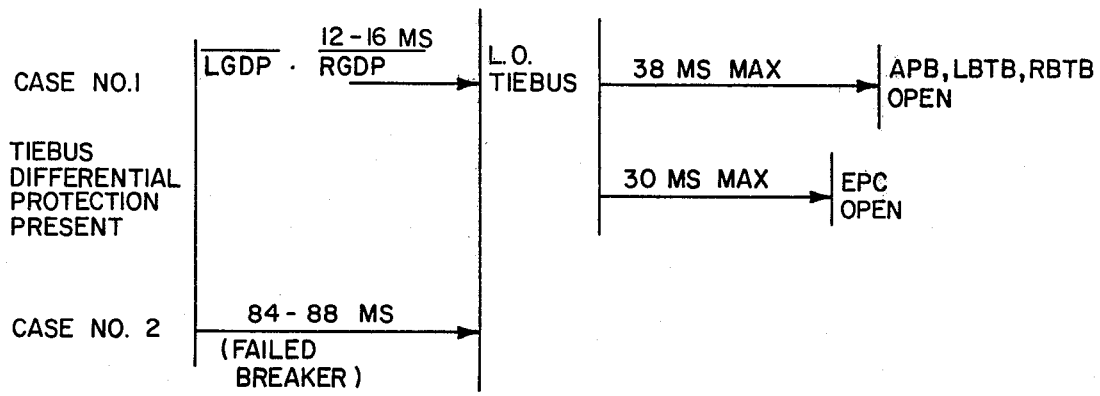
FIG. 12 is a micro bus power control unit differential current fault detection and isolation flow diagram for the bus power control unit of FIG. 1.

Reference is now made to FIGS. 10, 11 and 12 which are flow diagrams depicting fault isolation as it occurs in the preferred embodiment of the invention as shown and described with respect to FIG. 1.

The primary purpose of flow diagrams is to illustrate how the system removes a fault from the system by isolating the fault through breaker control in a programmed manner. In the repair of the system to correct faults that appear permanent rather than transient, the repairmen need only observe the breaker sequence to locate the region and flow path in which the fault occurs and thereafter, investigate that region to determine the exact location of the fault.

FIG. 10, in a flow diagram fashion, depicts the differential fault current detection DP isolation function in respect of either one of the generator control units (GCU'S) i.e., LGCU 38 or RGCU 34. In the preferred emgodiment, a differential current of 15 to 25 amperes (20±5 amps) is considered to be a fault condition. In the GCU'S of the system, the isolation procedure depends on the state of the GCB and the BTB involved. The condition of GCB and BTB will be in pairs. In all situations, the system is designed to respond with some action within 12 to 16 milliseconds.

It is to be understood in the description that follows that breaker conditions indicated are reflected by the lighting of lamps (not shown) in the aircraft cockpit. Each breaker is provided with an auxiliary contact (not shown) connected electrically to the lamps.

CASE NO. 1

If the GCB and BTB are closed and DP is true (differential current >15 to 25 amps) for 12-16 msec, the BTB is commanded open. It at this time, a tie bus DP (tie bus differential current protection-TBDP) is not present, the GCB is also commanded open. Both breakers GCB and BTB, barring failure, will open within 30 msec of this command. If the DP persists for 4 msec after both breakers have opened, a generator control relay (not shown), which cuts power to the field of the generator, is commanded open and the BTB is commanded closed to resupply power to the loads. Accordingly, the fault must have been in the generator or its feeder. If the DP goes away within 4 msec after both breakers have opened, the breakers are locked out.

CASE NO. 2

If the GCB and BTB are closed and DP is true for 12-16 msec, the BTB is commanded open. If a TBDP current is present, the GCB will not be opened immediately. The BTB will open within 30 msec. If the DP goes away within 4 msec, or if the DP persists but no current is sensed by the overlap current transformers (by no current, it is meant that the current sensed is less than 10±4 amp); the BTB is locked out and an overlap fault signal is sent to the BPCU. If the DP persists with greater than 10±4 amps being sensed by the overlap current transformers, the GCB is commanded open. The GCB will open within 30 msec, after which the DP current will go away (within 4 msec). The DP condition will go away because only a fault in the overlap zone on the load side of the BTB would cause the tie bus DP current and overlap current to flow with the BTB open. To have the DP current continue to flow after the GBC opens would be impossible.

CASE NO. 3

When GCB is closed and the BTB is open and a DP fault persists for 12-16 msec, action is taken. If there is a tie bus DP present with no overlap current flowing, the BTB is locked out and an overlap fault signal is sent to the BPCU in order to open all breakers on the tie bus. If a tie bus DP does not exist or if overlap current is flowing, the GCB is commanded open. THe GCB will open within 30 msec. If the DP goes away within 4 msec after the GBC opens, the GCB and BTB are locked out. If the DP persists for 4 msec after the GCB opens, the GCR is commanded open and the BTB is commanded close.

CASE NO. 4

When the GCB is open and the BTB is closed and a DP fault persists for 12-16 msec, the BTB is commanded open. The BTB wll open within 30 msec. If the DP goes away within 4 msec, the GCB and BTB are locked out. If the DP persists for 4 msec, the GCR is commanded open and the BTB is commanded to close.

CASE NO. 5

When both the GCB and BTB are open and a DP fault persists for 12-16 msec, the state of the tie bus DP is considered. If a tie bus DP fault exists, then the BTB is locked out and the overlap fault signal is sent to the BPCU. This will open all breakers on the tie bus, alleviating the fault. If the tie bus DP fault does not exist, then the GCR is commanded open and the BTB is locked out.

Reference is now made to FIG. 11 which shows a flow chart timing diagram for APGCU fault isolation. It should be noted that the flow chart differs materially from that shown in FIG. 10 in respect of the GCU because there is no BTB on the APU channel.

CASE NO. 1

When the APB is closed and a DP fault persists for 12–16 msec, the APB is commanded open. The APB will open within 30 msec. If the DP fault persists for 4 msec, the GCR is commanded open. If the DP fault goes away within 4 msec, an overlay fault signal is sent to the BPCU which locks out all breakers on the tie bus.

CASE NO. 2

When the APB is open and a DP fault persists for 12–16 msec, the GCR is commanded open.

CASE NO. 3

The last path illustrated takes into consideration a failute of the APB.

Reference is now made to FIG. 12 which shows a flow chart timing diagram for the BPCU which directly controls the EPC and indirectly controls the RBTB and LBTB and the APB.

CASE NO. 1

If a tie bus DP fault persists for 12–16 msec with no DP fault in either of the power channels from the left generator 11 or right generator 12, a tie bus lockout TBLO signal is sent to all GCU'S, and the EPC is commanded open. As a worst case, it may be assumed that the EPC will open in 30 msec and the other breakers will open in 38 msec. The additional 8 msec, is the time consumed in signal travel through serial link communications (not shown).

CASES NO. 2

The path illustrated takes into consideration any breaker sensing circuitry or communication failures that could cause the fault to persist for 84 to 88 msec.

In the preferred embodiment of the invention, all information communicated between the GCU'S and BPCU passes via a serial link (not shown). A star configuration (not shown) is used in which the BPCU is the master with a separate bidirectional serial link to each GCU. All information passes to and from the BPCU with its communications interchange (not shown) acting as a source and the GCU'S responding thereto.

From the foregoing description, it is apparent that the invention described allows for the clearing of any differential current fault in the system quickly leaving as many loads powered as possible, while simultaneously minimizing breaker action thereby reducing the number of power interruptions.

Although this invention has been illustrated and described in connection with the particular embodiment illustrated, it will be apparent to those skilled in the art that various changes may be made therein without departing from the spirit of invention as set forth in the appended claims.

We claim:

1. A fault current detection, isolation and clearing system for use in an integrated power generating and distribution arrangement having multiple generators electrically connected to loads and to a distribution bus through circuit breakers, said system and arrangement including in combination:

power control logic means;
circuit breaker condition detection means having an output electrically coupled to said power control logic means; and
fault current detection circuit means coupled to the electrical connections of the power generating and distribution arrangement and having an output electrically coupled to said power control logic means;
said power control logic means having an output controllingly electrically connected to said circuit breakers to control said circuit breakers and clear said faults from said power generating and distribution arrangement as a function of circuit breaker conditions and fault currents detected.

2. The combination of claim 1, wherein said fault current detection circuit means are inductively coupled to the electrical connections of the system by current transformers.

3. The combination of claim 2, wherein said fault current detection circuit means include a set of at least two current transformers, and said fault current detection circuit means output provides a signal indicative of a differential current detected by said current transformers.

4. The combination of claim 3, wherein said fault current detection circuit means includes more than one set of current transformers.

5. The combination of claim 1, wherein said circuit breaker condition detection means includes an auxiliary contact in each of said power generating and distribution arrangement circuit breakers.

6. The combination of claim 1, wherein said system includes at least one current level detection circuit coupled to an electrical connection of said arrangement, said current level detection circuit having an output electrically connected to said power control logic whereby said power control logic means output controls said circuit breakers as a function of circuit breaker conditions, fault currents detected and current level detected.

7. The combination of claim 6, wherein said power control logic means is a microprocessor.

8. A fault current detection isolation and clearing system for use in an integrated power generating and distributing arrangement having multiple generators, including in combination:

first and second generators, each having a set of neutral armature conductors and a set of output conductors;
said set of output conductors of said first generator electrically connected through a first breaker to a load and to one side of a second breaker;
said set of output conductors of said second generator electrically connected to another side of said second breaker through a distribution bus;
a first current detection circuit means coupled respectively to said set of neutral armature conductors of said first generator, said set of output conductors between said first breaker and said load, and to said distribution bus, said first current detection circuit providing a differential current output signal only when a fault exists and is detected by said coupling to any one of said set of neutral armature conductors, said set of output conductors and said distribution bus;
a second current detection circuit means coupled to said set of output conductors from said first generator at a point between said first breaker and said second breaker, said second current detection circuit means providing an output signal whenever a fault exists and is detected by said second current transformer circuit means;

said first and second breakers each having a breaker control means;

a power control logic network electrically coupled to said first current detection circuit means output and said second current detection circuit output, said power control logic network having an output electrically connected to said breaker control means to control breaker action in response to faults detected within the system as a function of circuit breaker conditions.

9. The combination of claim 8, wherein said first and second breakers each have a circuit breaker condition detection means having an output.

10. The combination of claim 9, wherein said circuit breaker condition detection means output is electrically coupled to said power control logic network.

11. The combination of claim 10, wherein said first and second current detection circuit means are coupled to said conductors by current transformers.

12. The combination of claim 9, wherein said circuit breaker condition detection means is an auxiliary contact electrically connected to said circuit breaker condition detection means output lead.

13. The combination of claim 12, wherein said power control logic network is a microprocessor.

14. The combination of claim 8, which further includes a third current detection circuit means coupled to said set of output conductors from said first generator at a point adjacent said second breaker, said third current detection circuit means having an output indicative of a fault detected in said output conductors.

15. A current detection and clearing system for use in an integrated power generating and distribution arrangement having multiple generators including in combination:

first, second and third generators having neutral armature windings and generator circuit breakers connecting said first and second generators to first and second loads, and said third generator to a tie bus;

bus tie breakers connected in series and between respectively said first load and said tie bus and said second load and said tie bus;

first, second, third and fourth differential fault current detection circuits, each of said first and second differential fault current detection circuits providing outputs indicative of a fault detected between the neutral armature windings respectively of said first and second generator, the first and second load and the bus tie, said third differential fault detection circuit providing an output indicative of a fault detected between the neutral armature windings of the third generator and the tie bus;

said fourth differential fault detection circuit providing an output indicative of a fault detected between respectively the first load and said bus tie breaker and the second load and said bus tie breaker and between the third generator and said third generator circuit breaker;

each of said breakers having a breaker condition detection means which provides an output indicative of the breaker condition;

each of said breakers further including a breaker control means which allows independent control of each of said breakers; and a power control logic network electrically coupled to said circuit breaker condition detection means output and to the outputs of said first, second, third and fourth fault detection circuits, said power control logic network having an output electrically connected to each breaker control means to control breaker action in a programmed manner in response to faults detected within said integrated power generating and distribution arrangement.

16. The combination of claim 15, wherein said first load and said second load each have a plurality of different power channels available from said first, second and third generators through said breakers and said tie bus.

17. The combination of claim 16, wherein there is provided overlap current detection circuits which provide outputs indicative of a current level detected in a power channel to said first load from said second generator and said third generator and in a power channel to said second load from said first generator and said third generator.

18. The combination of claim 16, wherein said first, second and third generators, each have a set of input conductors and a set of output conductors, said sets of output conductors of said first and second generators electrically connected through a respective generator circuit breaker to said first and second load, and to one side of a respective bus tie breaker.

19. The combination of claim 18, wherein said first and second differential fault detection circuits each include a current transformer circuit inductively coupled respectively to a set of input conductors of respectively said first and second generators, the output conductors to said first and second load and the tie bus.

20. The combination of claim 19, wherein said third differential fault detection circuit includes a current transformer circuit inductively coupled respectively to said output conductors from the associated generator circuit breakers of first and second generators at a point between said associated generator circuit breaker and said bus tie breakers, said third differential fault detection circuit further including a current transformer inductively coupled to said output leads from said third generator to the generator circuit breaker associated with said third generator.

21. The combination of claim 20, wherein there is further included a fourth differential fault detection circuit which includes a current transformer circuit inductively coupled to the input set of conductors of said third generator and said tie bus and has an output indicative of a fault detected between an input to said third generator and said tie bus.

22. The combination of claim 21, wherein said power control logic network has electrically coupled thereto said output of the current transformer circuit of said fourth differential fault detection circuit whereby said power control logic network output is additionally responsive to faults detected by said fourth differential fault detection circuit.

23. The combination of claim 16, wherein there are provided overlap current detection circuits which are inductively coupled respectively to the connections between said first load and the associated bus tie breaker and to the connections between said second load and the associated bus tie breaker, said overlap current detection circuits providing outputs indicative of a fault detected in a power channel to said first load from said second generator and said third generator and in a power channel to said second load from said first generator and said third generator.

24. The combination of claim 23, wherein said power control logic network has electrically coupled thereto said outputs from said overlap current detection circuits whereby said power control logic network output is additionally responsive to current levels detected by said overlap fault detection circuits.

25. A differential fault current detection system for use in a power generating and distribution arrangement having multiple generators, including in combination:

a first generator, second generator and auxiliary generator, each having a set of neutral armature conductors and a set of output conductors;

said set of output conductors of said first and said second generators respectively electrically connected through a first generator circuit breaker and a second generator circuit breaker to a first load and a second load and to one side of a first bus tie breaker and a second bus tie breaker;

said set of output conductors of said auxiliary generator connected through an auxiliary bus tie breaker respectively to the other side of each of said first and second bus tie breakers through a tie bus;

a first generator differential fault current transformer circuit means inductively coupled respectively to said set of neutral armature conductors of said first generator, said set of output conductors between said first generator circuit breaker and said first load, and to said tie bus;

a second generator differential fault current transformer circuit means inductively coupled respectively to said set of neutral armature conductors of said second generator, said set of output conductors between said second bus tie breaker and said second load, and to said tie bus;

said first and second generator differential fault current transformer circuits providing an output signal only when a fault exists and is detected by said inductive couplings to any one of said sets of neutral armature conductors, said sets of output conductors and said tie bus;

a tie bus differential fault current detection circuit means inductively coupled to said sets of output conductors respectively from said first and said second generators at points between said first and second generator circuit breakers and said first and second bus tie breakers, said tie bus differential fault current detection circuit means is also coupled to said set of output conductors of said auxiliary generator;

said tie bus differential fault current detection circuit means providing an output whenever a fault exists and is detected by said tie bus differential fault current detection circuit means;

said first and second generator circuit breakers, said first and second tie breakers and said auxiliary bus tie breaker each having a breaker control means and a circuit breaker condition detection means, said circuit breaker condition detection means having an output lead connect thereto upon which appears a signal indicative of the circuit breaker condition;

a power control logic network electrically coupled to said circuit breaker condition detection means output and to the outputs of said first and second generator differential fault current transformer circuit means, and said tie bus differential current detection circuit means; and said power control logic network having an output electrically connected to each breaker control means to control breaker action in a programmed manner in response to the condition of said breakers and faults detected within the system.

26. The combination of claim 25, wherein said first load and said second load each have a plurality of different power channels available from said first, second and third generators through said breakers and said tie bus.

27. The combination of claim 26, wherein there is included an auxiliary generator differential fault current transformer circuit inductively coupled respectively to said set of neutral armature conductors of said auxiliary generator and said tie bus, said auxiliary generator fault current transformer circuit providing an output signal only when a fault exists and is detected by the inductive couplings to any one of said neutral armature conductors of said auxiliary generator and said tie bus.

28. The combination of claim 27, wherein there are provided overlap current detection circuits which are inductively coupled to said output conductors on the load side of said first and second bus tie breakers, said overlap current detection circuits providing outputs indicative of a current level detected in a power channel to said first load from said second generator and said auxiliary generator and in a power channel to said second load from said first generator and said auxiliary generator.

29. The combination of claim 28, wherein said power control logic network has electrically coupled thereto said auxiliary generator fault current transformer circuit output and said overlap current detection circuit output whereby said power control logic is additionally responsive to a fault detected by said auxiliary generator fault current transformer circuit and said overlap current level detected by said overlap current detection circuits.

* * * * *